United States Patent
Goto et al.

(10) Patent No.: US 6,236,452 B1
(45) Date of Patent: May 22, 2001

(54) OPTICAL AMPLIFIER EVALUATION METHOD AND OPTICAL AMPLIFIER EVALUATION DEVICE

(75) Inventors: Hiroshi Goto; Yukio Tsuda, both of Isehara; Youji Sonobe, Machida, all of (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/214,686

(22) PCT Filed: May 6, 1998

(86) PCT No.: PCT/JP98/02015

§ 371 Date: Jan. 8, 1999

§ 102(e) Date: Jan. 8, 1999

(87) PCT Pub. No.: WO98/53538

PCT Pub. Date: Nov. 26, 1998

(30) Foreign Application Priority Data

May 19, 1997 (JP) .................................................... 9-128892

(51) Int. Cl.[7] .................................................... G01N 21/00
(52) U.S. Cl. .................................................... 356/73.1
(58) Field of Search ............................ 356/73.1; 359/110, 359/177, 179, 337, 341, 161, 184, 187, 134; 385/1, 2, 15

(56) References Cited

U.S. PATENT DOCUMENTS 5,677,781  * 10/1997  Mori et al. ............................ 359/179

FOREIGN PATENT DOCUMENTS

| 7-226549 | 8/1995 | (JP) . |
| 9-33394 | 2/1997 | (JP) . |
| 9-264811 | 10/1997 | (JP) . |
| 10-12955 | 1/1998 | (JP) . |

OTHER PUBLICATIONS

Technical Research Report of IEICE, vol. 97 No. 299 (Japan), IEICE Oct. 2, 1997; pp. 13–18.

Electronics, No. 523, Japan. K.K. Omusha Dec. 1, 1997, p. 69.

Optronics, No. 164, Japan AUg. 10, 1995; pp. 121–124.

* cited by examiner

Primary Examiner—Frank G. Font
Assistant Examiner—Tu T. Nguyen
(74) Attorney, Agent, or Firm—Frishauf, Holtz, Goodman, Langer & Chick, P.C.

(57) ABSTRACT

This invention is applied to an optical amplifier evaluation method of modulating by an optical modulator 23 light output from a light source 1 into a rectangular optical signal which is enabled/disabled in a predetermined period, then applying the optical signal to an optical fiber amplifier 2 to be measured, and obtaining the gain and noise figure of the optical fiber amplifier from the light intensities in the ON and OFF periods of an optical signal output from the optical fiber amplifier and the light intensity in the ON period of an optical signal input to the optical fiber amplifier. Output light from the optical fiber amplifier in a no-input state is passed through an optical path extending from the light source to the optical fiber amplifier and an optical path extending from the optical fiber amplifier to a light intensity measurement position, thereby obtaining optical losses on the respective optical paths. By the obtained optical losses, the light intensities are corrected. As a result, the gain G and noise figure NF of the optical fiber amplifier 2 can be attained with high precision.

40 Claims, 13 Drawing Sheets

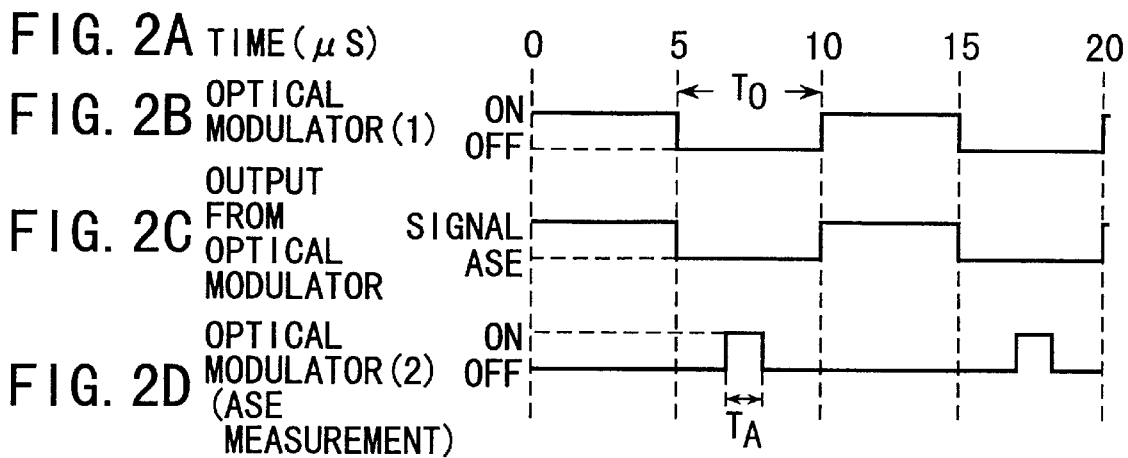
FIG. 2A TIME (μS)
FIG. 2B OPTICAL MODULATOR (1)
FIG. 2C OUTPUT FROM OPTICAL MODULATOR
FIG. 2D OPTICAL MODULATOR (2) (ASE MEASUREMENT)
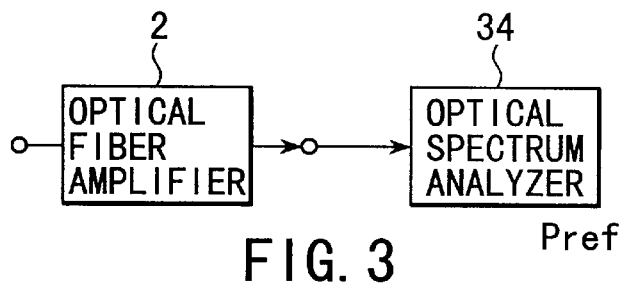
FIG. 3
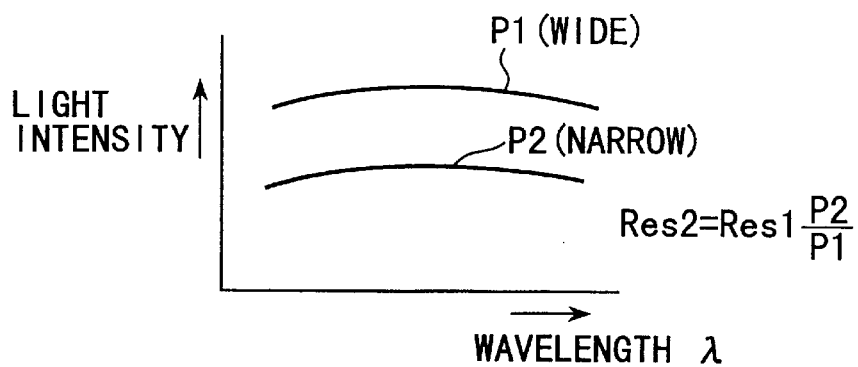
FIG. 4

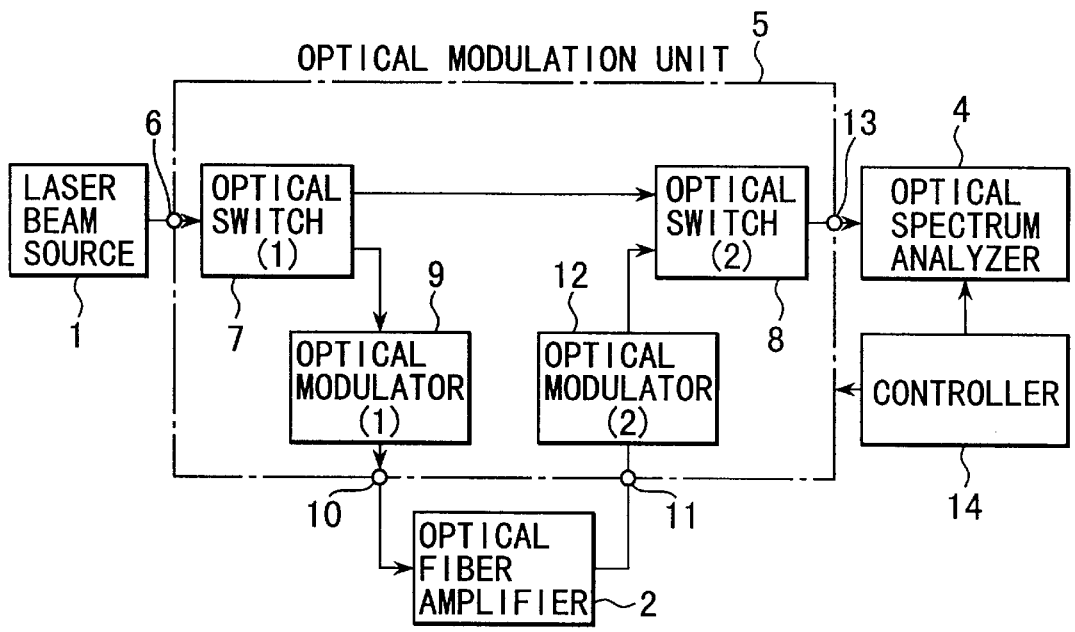
FIG. 16 (PRIOR ART)
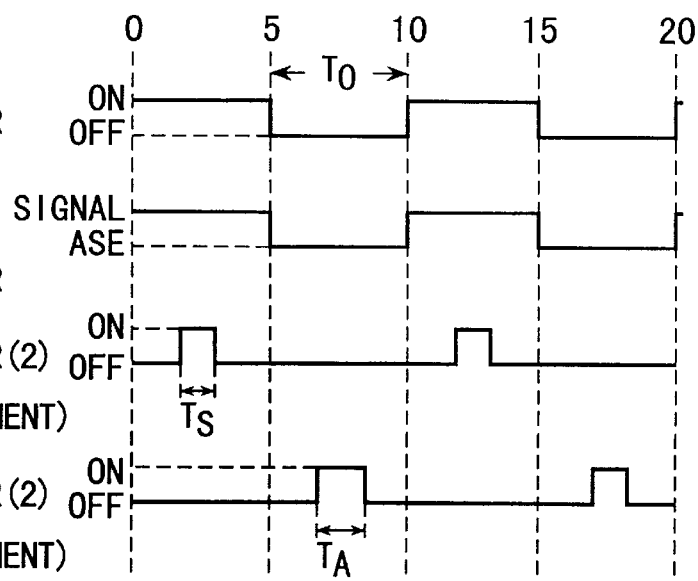

OPTICAL AMPLIFIER EVALUATION METHOD AND OPTICAL AMPLIFIER EVALUATION DEVICE

TECHNICAL FIELD

The present invention relates to an optical amplifier evaluation method and apparatus for evaluating the characteristics of an optical fiber amplifier and, more particularly, to an optical amplifier evaluation method and apparatus for evaluating the gain and noise figure of the optical fiber amplifier using a pulse method.

BACKGROUND ART

As is well known, in recent years, optical cables such as optical submarine cables are often installed over long distances along with rapid advance of the optical communication network.

In the optical communication network, an optical signal attenuates during transmission through the optical cable to decrease the S/N of the optical signal. Such a decrease in S/N of the optical signal is prevented by installing repeaters every predetermined distance.

More specifically, each repeater installed at a predetermined distance converts an optical signal received from each optical fiber into an electrical signal at the terminal of an optical cable in a given section, amplifies the electrical signal, converts the amplified electrical signal into an optical signal, and transmits the optical signal to each optical fiber of an optical cable in the next section, thereby preventing a decrease in S/N of the optical signal.

Recently, optical fiber amplifiers for directly amplifying an optical signal have been developed.

This optical fiber amplifier amplifies communication signal light such that an optical fiber with a core doped with a rare-earth element such as erbium is excited by light having a shorter wavelength than that of the communication signal light.

This optical fiber amplifier can be inserted in each optical fiber of the optical cable to easily prevent a decrease in S/N of the optical signal.

It is important to evaluate the characteristics of the optical fiber amplifier when a new optical communication network is constructed or in periodic maintenance and inspection.

In evaluating the characteristics of the optical fiber amplifier, the gain G given by the ratio of the light intensity $P_{IN}$ of an input optical signal to the light intensity $P_{OUT}$ of an output optical signal must be measured because the optical fiber amplifier is a kind of amplifier.

As is well known, in the optical amplifier, even if no optical signal is input to the input terminal of the optical fiber amplifier, its optical amplification mechanism causes spontaneous emission, and the spontaneous emission is amplified and output to the output terminal of the optical fiber amplifier.

The amplified spontaneous emission (ASE) acts as noise to an amplified optical signal.

In, therefore, evaluating the characteristics of the optical fiber amplifier, the light intensity $P_{ASE}$ of the spontaneous emission (ASE) must be measured.

Evaluation of the characteristics of the optical fiber amplifier generally employs a noise figure NF given by equation (1) including the measured gain G and light intensity $P_{ASE}$ as indices representing the noise resistance performance:

$$NF = P_{ASE}/(h \cdot v \cdot G \cdot \Delta v) \qquad (1)$$

where h: Planck's constant
v: light frequency of input optical signal
G: gain
$\Delta v$: measurement frequency resolving power width (measurement frequency width) of light intensity measurement device.

The characteristics of the optical fiber amplifier can be evaluated by the gain G and noise figure NF.

To evaluate the characteristics of the optical fiber amplifier, a laser beam source 1 and an optical fiber amplifier 2 are conventionally connected to an optical spectrum analyzer 4 via an optical switch 3, as shown in FIG. 14.

The optical switch 3 is first switched to the laser beam source 1 side to cause the optical spectrum analyzer 4 to obtain the light intensity PIN as a function of the light wavelength λ of an optical signal input to the optical fiber amplifier 2 (lower curve shown in FIG. 15).

The optical switch 3 is switched to the optical fiber amplifier 2 to cause the optical spectrum analyzer 4 to obtain the light intensity $P_{OUT}$ as a function of the light wavelength λ of an optical signal output from the optical fiber amplifier 2 (upper curve shown in FIG. 15).

As a result, the gain G of the optical fiber amplifier is given by equation (2) including the input light intensity $P_{IN}$ and the output light intensity $P_{OUT}$:

$$G = P_{OUT}/P_{IN} \qquad (2)$$

As shown in FIG. 15, the light intensity $P_{ASE}$ of spontaneous emission (ASE) is buried in the light intensity $P_{OUT}$ of the amplified output optical signal. For this reason, the light intensity $P_{ASE}$ of spontaneous emission (ASE) is difficult to directly measure.

As a method of measuring the light intensity $P_{ASE}$ of spontaneous emission (ASE), a level interpolation method, a polarization nulling method, and a pulse method are proposed.

Of the three methods, the pulse method utilizes a relatively long recovery time required to recover to a ground state for light of a metastable rare-earth element such as erbium doped in the core of the optical fiber of the optical fiber amplifier.

That is, in the pulse method, an optical signal input to the optical fiber amplifier is enabled/disabled in a cycle shorter than the recovery time. The light intensity $P_{OUT}$ of an output optical signal is measured in the ON period, and the light intensity $P_{ASE}$ of spontaneous emission (ASE) is measured in the OFF period.

FIG. 16 is a block diagram of an optical amplifier evaluation apparatus adopting this pulse method.

Light with a wavelength λ emitted from the laser beam source 1 is incident on a first optical switch 7 via an input terminal 6 of an optical modulation unit 5.

The first optical switch 7 switches the incident light to a second optical switch 8 or a first optical modulator 9 on the basis of an instruction from a controller 14.

As shown in FIGS. 17A to 17E, the first optical modulator 9 modulates the incident light into a rectangular optical signal which is enabled/disabled in a predetermined cycle $T_0$ of, e.g., 5 μs shorter than the above-mentioned recovery time, and outputs the optical signal to the input terminal of the optical fiber amplifier 2 via an output terminal 10.

The amplified optical signal output from the output terminal of the optical fiber amplifier 2 is input to a second optical modulator 12 via an input terminal 11.

The second optical modulator 12 functions to pass the optical signal only during a partial period $T_S$ of the ON period or a partial period $T_A$ of the OFF period of the optical signal output from the optical fiber amplifier 2.

Either of the periods $T_S$ and $T_A$ is employed in accordance with an instruction from the external controller 14.

The optical signal output from the second optical modulator 12 is input to the second optical switch 8.

The second optical switch 8 selects the optical signal from the first optical switch 7 or the optical signal from the second optical modulator 12 on the basis of an instruction from the controller 14, and inputs the selected one to the optical spectrum analyzer 4.

The optical spectrum analyzer 4 analyzes the spectrum of the input optical signal to obtain the light intensity P for the wavelength λ or light frequency ν.

In the optical amplifier evaluation apparatus having this arrangement, the optical switches 7 and 8 are first switched to the partner sides.

Light incident on the optical modulation unit 5 from the laser beam source 1 passes through the optical switches 7 and 8 to directly enter the optical spectrum analyzer 4.

The optical spectrum analyzer 4 regards the incident light as light incident on the optical fiber amplifier 2, and measures the light intensity $P_{IN}$. The optical switches 7 and 8 are respectively switched to the optical modulators 9 and 12. In the second optical modulator 12, the partial period $T_S$ of the ON period is set.

In this state, light is incident on the optical spectrum analyzer 4 during the partial period $T_S$ of the ON period of the optical signal output from the optical fiber amplifier 2.

The optical spectrum analyzer 4 regards the incident light as light output from the optical fiber amplifier 2, and measures the light intensity $P_{OUT}$.

While the optical switches 7 and 8 are respectively switched to the optical modulators 9 and 12, the partial period $T_A$ of the OFF period is set in the second optical modulator 12.

In this state, an optical signal in the partial period $T_A$ of the OFF period of the optical signal output from the optical fiber amplifier 2 is incident on the optical spectrum analyzer 4.

The optical spectrum analyzer 4 regards the incident light as spontaneous emission (ASE) from the optical fiber amplifier 2, and measures the light intensity $P_{ASE}$.

The controller 14 obtains the gain G and noise figure NF of the optical fiber amplifier 2 using equations (2) and (1).

In this way, the optical amplifier evaluation apparatus adopting the pulse method measures the gain G and noise figure NF of the optical fiber amplifier 2.

However, the optical amplifier evaluation apparatus shown in FIG. 16 suffers the following problems which should be solved.

To calculate the noise figure NF, the absolute level of the light intensity $P_{ASE}$ of spontaneous emission (ASE) from the optical fiber amplifier 2 must be measured.

An optical loss on the optical path extending from the input terminal 11 to the second optical modulator 12, the second optical switch 8, and an output terminal 13 in the optical modulation unit 5 of FIG. 16 must be accurately measured to correct the light intensity $P_{ASE}$ of spontaneous emission (ASE) measured by the optical spectrum analyzer 4.

In general, a laser beam incident on the optical modulation unit 5 from the laser beam source 1 has a polarization plane.

The first and second optical modulators 9 and 12 also have such polarization characteristics as to change the light intensity of an output optical signal upon a change in polarization direction of the input optical signal.

The polarization direction of the laser beam incident on the optical modulation unit 5 from the laser beam source 1 is not always constant but varies.

More specifically, the polarization direction of a laser beam when an optical loss on the optical path is measured, and the polarization direction of a laser beam when the light intensity $P_{ASE}$ of spontaneous emission (ASE) is actually measured are difficult to always coincide with each other.

Accordingly, in the optical amplifier evaluation apparatus shown in FIG. 16, the light intensity $P_{ASE}$ of spontaneous emission (ASE) cannot be accurately corrected.

As described above, the gain G of the optical fiber amplifier 2 is calculated from the ratio of the light intensity $P_{OUT}$ of an output optical signal to the light intensity $P_{IN}$ of an input optical signal in the optical fiber amplifier 2.

The optical paths of the input and output optical signals between the laser beam source 1 and the optical spectrum analyzer 4 are different from each other.

Accordingly, optical losses on the respective optical paths must be independently obtained.

However, since the optical modulator present on each optical path has the above polarization characteristics, the optical loss on the optical path cannot be accurately obtained.

In the optical amplifier evaluation apparatus shown in FIG. 16, therefore, the measurement precision of the gain G of the optical fiber amplifier 2 decreases.

In spectrum measurement for the light intensity $P_{ASE}$ of spontaneous emission (ASE), since the light intensity per unit wavelength must be measured, the likelihood ratio of the frequency (wavelength) resolving power width Δν of the optical spectrum analyzer must be set high.

The set frequency (wavelength) resolving power width representing the measurement frequency width of the optical spectrum analyzer 4 must be narrow in order to prevent interference between channels for a wavelength-multiplexed optical signal.

Generally, the narrower the set frequency (wavelength) resolving power width Δν is, the lower the likelihood ratio of the resolving power is.

As a result, in the optical amplifier evaluation apparatus shown in FIG. 16, an error caused by the likelihood ratio of the resolving power is large.

DISCLOSURE OF INVENTION

The present invention has been made in consideration of the above situation, and has as its object to provide an optical amplifier evaluation method and apparatus capable of measuring optical losses on optical paths for input and output optical signals to and from an optical fiber amplifier with high precision and measuring the light intensities of input light and output light to and from the optical fiber amplifier with high precision by using light output from the optical fiber amplifier in a no-input state, thereby increasing the measurement precisions of the gain and light intensity of spontaneous emission (ASE) in the optical fiber amplifier, and thus evaluating the noise figure with high precision.

It is another object of the present invention to provide an optical amplifier evaluation method and apparatus capable of further increasing the measurement precision of the gain of the optical fiber amplifier by bypassing the second optical modulator in an optical path during gain measurement.

It is still another object of the present invention to provide an optical amplifier evaluation method capable of calibrating the set frequency (wavelength) resolving power width in an optical spectrum analyzer to obtain a high likelihood ratio of the resolving power, greatly increase the measurement precision of the light intensity at each wavelength, and evaluate the optical fiber amplifier with high precision.

According to one aspect of the present invention, there is provided an optical amplifier evaluation method comprising the steps of:

modulating light output from a light source into a rectangular optical signal having predetermined ON and OFF periods by a first optical modulator;

applying the optical signal modulated by the first optical modulator to an optical fiber amplifier to be evaluated;

passing the optical signal output from the optical fiber amplifier to be evaluated through a second optical modulator only during a given period in the OFF period of the optical signal modulated by the first optical modulator, thereby measuring a light intensity $P_{ASE}$ of spontaneous emission in the optical fiber amplifier by a light intensity measurement device;

obtaining an optical loss on an optical path extending from the optical fiber amplifier to the light intensity measurement device using output light from the optical fiber amplifier in a no-input state, and correcting, using the obtained optical loss, the light intensity $P_{ASE}$ of spontaneous emission in the optical fiber amplifier that is measured by the light intensity measurement device; and obtaining a noise figure NF of an optical signal in the optical fiber amplifier using a corrected light intensity $P_{ASE}'$ of spontaneous emission in the optical fiber amplifier in accordance with the following equation:

$$NF = P_{ASE}'/(h \cdot v \cdot G \cdot \Delta v)$$

where h: Planck's constant v: light frequency of input optical signal

G: gain $\Delta v$: measurement frequency resolving power width (measurement frequency width) of the light intensity measurement device.

According to another aspect of the present invention, there is provided an optical amplifier evaluation methods comprising the steps of:

modulating light output from a light source into a rectangular optical signal having predetermined ON and OFF periods by a first optical modulator;

applying the optical signal modulated by the first optical modulator to an optical fiber amplifier to be evaluated;

passing the optical signal output from the optical fiber amplifier to be evaluated through a second optical modulator only during a given period in the OFF period of the optical signal modulated by the first optical modulator, thereby measuring a light intensity $P_{ASE}$ of spontaneous emission in the optical fiber amplifier by a light intensity measurement device;

obtaining an optical loss on an optical path extending from the optical fiber amplifier to the light intensity measurement device using output light from an unpolarized light generator, and correcting, using the obtained optical loss, the light intensity $P_{ASE}$ of spontaneous emission in the optical fiber amplifier that is measured by the light intensity measurement device; and obtaining a noise figure NF of an optical signal in the optical fiber amplifier using a corrected light intensity $P_{ASE}'$ of spontaneous emission in the optical fiber amplifier in accordance with the following equation:

$$NF = P_{ASE}'/(h \cdot v \cdot G \cdot \Delta v)$$

where h: Planck's constant v: light frequency of input optical signal

G: gain $\Delta v$: measurement frequency resolving power width (measurement frequency width) of the light intensity measurement device.

According to still another aspect of the present invention, there is provided an optical amplifier evaluation apparatus for practicing the optical amplifier evaluation method, characterized by comprising:

switching means arranged between a first terminal for receiving an optical output from the light source, an input terminal of the first optical modulator, an output terminal of the first optical modulator, an input terminal of the second optical modulator, an output terminal of the second optical modulator, an output terminal to the optical fiber amplifier, an input terminal from the optical fiber amplifier, and an output terminal to the light intensity measurement device; and control means capable of measuring the light intensity $P_{ASE}$ of spontaneous emission in the optical fiber amplifier by a first switching operation of the switching means, measuring the gain G of the optical fiber amplifier by a second switching operation, and measuring the measurement frequency resolving power width (measurement frequency width) $\Delta v$ of the light intensity measurement device by a third switching operation.

BRIEF DESCRIPTION OF DRAWINGS

FIGS. 2A to 2D are timing charts showing measurement of the light intensity by the optical amplifier evaluation apparatus;

FIG. 3 is a block diagram for explaining calibration of the light intensity in the optical amplifier evaluation method;

FIG. 4 is a graph showing the spectrum characteristics of reference light used for calibration in the optical amplifier evaluation method;

FIG. 16 is a block diagram showing the schematic arrangement of a conventional optical amplifier evaluation apparatus; and FIGS. 17A to 17E are timing charts showing measurement of the light intensity by the conventional optical amplifier evaluation apparatus.

BEST MODE OF CARRYING OUT THE INVENTION

Figure 1:
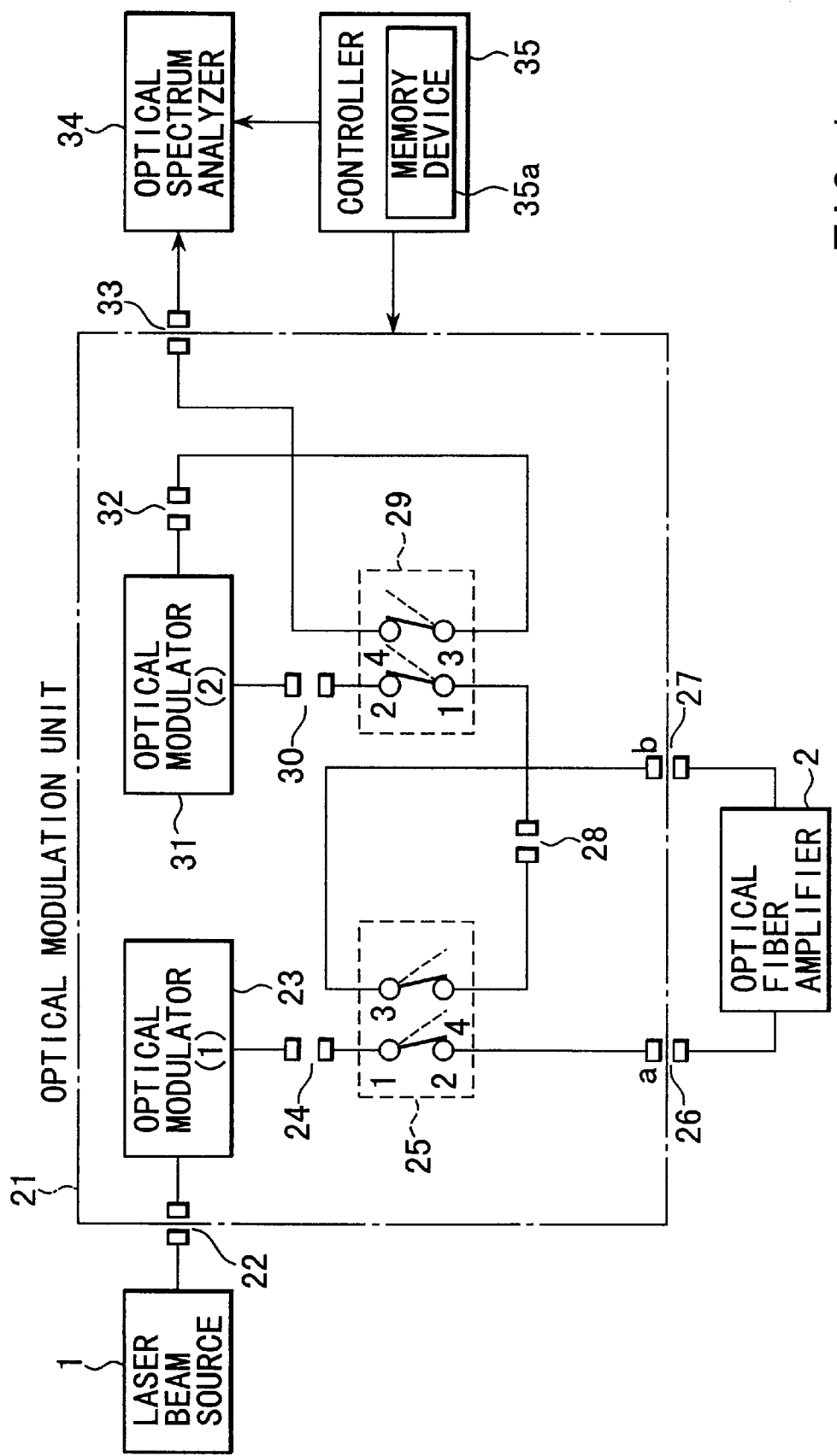
FIG. 1 is a block diagram showing the schematic arrangement of an optical amplifier evaluation apparatus to which an optical amplifier evaluation method according to the first embodiment of the present invention is applied.

The present invention will be first generally described.

The present invention is applied to an optical amplifier evaluation method of modulating by an optical modulator light output from a light source into a rectangular optical signal which is enabled/disabled in a predetermined period, then applying the optical signal to an optical fiber amplifier to be measured, and obtaining the gain and noise figure of the optical fiber amplifier from the light intensities in the ON and OFF periods of an optical signal output from the optical fiber amplifier and the light intensity in the ON period of an optical signal input to the optical fiber amplifier.

To solve the above problems, in the first optical amplifier evaluation method, output light from the optical fiber amplifier in a no-input state is passed through an optical path extending from the light source to the optical fiber amplifier and an optical path extending from the optical fiber amplifier to a light intensity measurement position, thereby obtaining optical losses on the respective optical paths. By the obtained optical losses, the light intensities are corrected.

As described above, in the optical fiber amplifier, even if no optical signal is input to the input terminal, spontaneous emission occurs and is amplified and output from the output terminal of the optical fiber amplifier.

Since output light in a no-input state is generated by spontaneous emission, it is free from any polarization component and has an almost flat wavelength characteristic.

Using, therefore, output light from the optical fiber amplifier in a no-input state, optical losses on the respective optical paths for optical signals input to and output from the optical fiber amplifier are measured. Consequently, even if optical components having polarization characteristics are interposed on the optical paths, optical losses can be always stably measured to correct the measured light intensities with high precision.

In the second optical amplifier evaluation method, the gain of the optical fiber amplifier is obtained from the light intensity in the ON period of an optical signal input to the optical fiber amplifier and the light intensity in the ON period of an optical signal output from the optical fiber amplifier. Part of the OFF period of the optical signal output from the optical fiber amplifier is extracted by the second optical modulator. The noise figure is obtained from the light intensity in the extracted period and the gain attained in advance.

In this method, the second optical modulator having a function of extracting part of the OFF period of an optical signal output from the optical fiber amplifier effectively operates only in obtaining the light intensity of spontaneous emission (ASE) in the optical fiber amplifier.

However, since the second optical modulator is not particularly necessary for obtaining the gain G of the optical fiber amplifier, the gain G is measured on an optical path on which the second optical modulator is bypassed.

More specifically, the optical modulator generally has larger polarization characteristics than those of other optical components such as an optical switch arranged on the optical path.

If these polarization characteristics can be canceled, the measurement precision can increase.

As for measurement of the light intensity of spontaneous emission (ASE), since spontaneous emission (ASE) itself is free from any polarization characteristics, as described above, an optical loss on the optical path can be calibrated using light from the optical fiber amplifier itself to measure the light intensity of spontaneous emission (ASE) with high precision while canceling the polarization characteristics of various optical components including the optical modulator present on the optical path.

To the contrary, an optical signal input to the optical fiber amplifier, and an output optical signal which is prepared by amplifying the input optical signal and output from the optical fiber amplifier are generally polarized and influenced by the polarization characteristics of the optical modulator.

By adopting the second method, however, (a) a gain G measurement error factor conventionally caused by the polarization characteristics of the second optical modulator can be eliminated by bypassing the second optical modulator.

(b) In the first optical modulator, the optical path extending from the light source to the first optical modulator is kept unchanged in both measurement of a light intensity $P_{IN}$ of an optical signal input to the optical fiber amplifier and measurement of a light intensity $P_{OUT}$ of an output optical signal.

If each light intensity is continuously measured within several minutes so as not to change the polarization state of the light source, the measurement error amount influenced by the polarization characteristics of the first optical modulator can be kept constant.

Since the gain G is calculated from the ratio of the light intensity $P_{OUT}$ to $P_{IN}$, as given by equation (2) above, the measurement error amount influenced by the polarization characteristics of the first optical modulator can be canceled to obtain the gain G with high precision.

That is, in the second method, the absolute value of the light intensity must be measured in measuring the intensity of spontaneous emission (ASE). However, the gain G does not require any absolute values of the light intensities $P_{IN}$ and $P_{OUT}$ and requires only an accurate relative value (ratio).

In the third optical amplifier evaluation method, each light intensity is measured by an optical spectrum analyzer, and the spectrum of output light from the optical fiber amplifier in a no-input state is analyzed by the optical spectrum analyzer. The calibrated value of the set frequency resolving power width is obtained from the ratio of level values of the spectrum for large and small set frequency resolving power widths.

Calibrating the set frequency resolving power value in this manner yields a higher likelihood ratio of the resolving power than in a conventional method in which no calibration is performed.

As a result, the set frequency resolving power width $\Delta v$ in equation (1) above can be attained with high precision.

In the third method, the noise figure NF in the optical fiber amplifier can be measured with higher precisions by calibrating the set frequency resolving power width $\Delta v$ in the optical spectrum analyzer.

Further, the fourth invention is applied to an optical amplifier evaluation apparatus for modulating by a first optical modulator light output from the light source into a rectangular optical signal which is enabled/disabled in a predetermined period, then applying the optical signal to an optical fiber amplifier to be measured, and obtaining the gain and noise figure of the optical fiber amplifier from the light intensities in the ON and OFF periods of an optical signal output from the optical fiber amplifier and the light intensity in the ON period of an optical signal input to the optical fiber amplifier.

The optical amplifier evaluation apparatus according to the fourth invention comprises a second optical modulator for extracting part of the ON period of an optical signal output from the optical fiber amplifier, an optical switch for switching optical paths between the output terminal of the first optical modulator, the input and output terminals of the optical fiber amplifier, the input and output terminals of the second optical modulator, and the input terminal of a light intensity measurement device on the basis of an external instruction, a means for operating the optical switch to obtain the gain of the optical fiber amplifier from the light intensity of the ON period of an optical signal input to the optical fiber amplifier and the light intensity of the ON period of an optical signal output from the optical fiber amplifier, a means for operating the optical switch to extract part of the OFF period of the optical signal output from the optical fiber amplifier by the second optical modulator, and obtaining the noise figure from the light:intensity in the extracted period and the obtained gain, and a means for operating the optical switch to form an optical path extending from the light source to the optical fiber amplifier and an optical path extending from the optical fiber amplifier to a light intensity measurement position, passing output light from the optical fiber amplifier in a no-input state through the respective optical paths to obtain optical losses on the optical paths, and correcting the light intensities by the obtained optical losses.

The optical amplifier evaluation apparatus with this arrangement according to the fourth invention comprises the optical switch for switching optical paths between the output terminal of the first optical modulator, the input and output terminals of the optical fiber amplifier, the input and output terminals of the second optical modulator, and the input terminal of the light intensity measurement device on the basis of an external instruction.

Operating the optical switch enables, e.g., a control device to automatically practice the first and second methods.

Embodiments of the present invention based on this general description will be explained below.

(First Embodiment)

FIG. 1 is a block diagram showing the schematic arrangement of an optical amplifier evaluation apparatus to which an optical amplifier evaluation method according to the first embodiment of the present invention is applied.

In FIG. 1, the same reference numerals as in the conventional optical amplifier evaluation apparatus shown in FIG. 16 denote the same parts, and a detailed description of the repetitive parts will be omitted.

Figure 12:
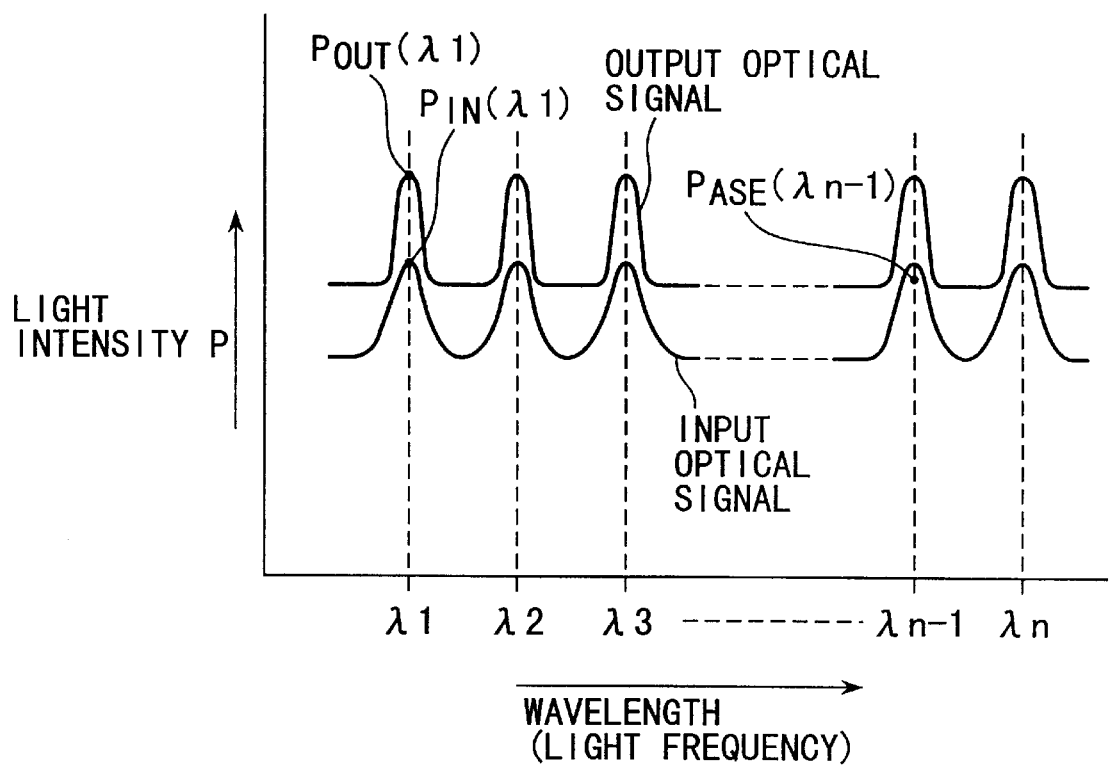
FIG. 12 is a graph showing the relationship between input and output optical signals at respective wavelengths λ in the optical amplifier evaluation method.

A laser beam source 1 emits wavelength-multiplexed light, as shown in the spectrum-analyzed waveform of an input optical signal in FIG. 12.

In other words, the input optical signal has peak values for wavelengths $\lambda_1, \lambda_2, \lambda_3, \ldots, \lambda_{n-1}, \lambda_n, \ldots$ The wavelength-multiplexed light with a plurality of wavelengths $\lambda_1, \lambda_2, \lambda_3, \ldots, \lambda_{n-1}, \lambda_n, \ldots$ emitted from the laser beam source 1 is incident on a first optical modulator 23 via an input terminal 22 of an optical modulation unit 21.

The first optical modulator 23 has the same arrangement as that of the first optical modulator 9 of the conventional apparatus shown in FIG. 16. As shown in timing charts of FIGS. 2A to 2D, the first optical modulator 23 modulates incident light into a rectangular optical signal which is enabled/disabled in a predetermined cycle $T_0$ of, e.g., 5 $\mu$s shorter than the above-mentioned recovery time, and outputs the optical signal to the first terminal of an optical switch 25 via a terminal 24.

The optical switch 25 has a total of four, first to fourth terminals. In a normal state, the first and second terminals are connected, and the third and fourth terminals are connected, as indicated by the solid lines in FIG. 1.

This state will be called a "steady state".

In response to a switching instruction from an external controller 35, the "steady state" shifts to a "switching state" in which the first and fourth terminals are connected, and the second and third terminals are open, as indicated by the dotted lines in FIG. 1.

That is, the optical switch 25 can switch between the two, "steady state" indicated by the solid lines and "switching state" indicated by the dotted lines in accordance with an instruction from the controller 35.

An optical signal passing through the first and second terminals of the optical switch 25 in the "steady state" is input to the input terminal of an optical fiber amplifier 2 via an output terminal 26 of the optical modulation unit 21.

The optical signal amplified and output from the output terminal of the optical fiber amplifier 2 is input to the third terminal of the optical switch 25 via an input terminal 27 of the optical modulation unit 21.

The optical signal input to the third terminal of the optical switch 25 in the "steady state" is input via the fourth terminal and a terminal 28 to the first terminal of an optical switch 29 having the same arrangement as that of the optical switch 25.

The optical signal input to the first terminal of the optical switch 29 is input to a second optical modulator 31 via the second terminal and a terminal 30.

As shown in timing charts of FIGS. 2A to 2D, the second optical modulator 31 functions to pass through the optical signal only during a partial period $T_A$ of the OFF period of the optical signal output from the optical fiber amplifier 2.

The optical signal modulated and output from the second optical modulator 31 returns to the third terminal of the optical switch 29 in the "steady state" via a terminal 32.

The optical signal input to the third terminal of the optical switch 29 is input to an external optical spectrum analyzer 34 via the fourth terminal and an output terminal 33 of the optical modulation unit 21.

The optical spectrum analyzer 34 analyzes the spectrum of an optical signal output from the output terminal 33 of the optical modulation unit 21 to obtain light intensities $P(\lambda)$ or $P(\nu)$ for respective wavelengths ($\lambda=\lambda_1, \lambda_2, \lambda_3, \ldots \lambda_{n-1}, \lambda_n, \ldots$,) or respective frequencies ($\nu=\nu_1, \nu_2, \nu_3, \ldots, \nu_{n-1}, \nu_n, \ldots$).

The controller 35 switches the optical switches 25 and 29 of the optical modulation unit 21 to the "steady state" or "switching state". In addition, the controller 35 calculates the gain G and noise figure NF of the optical fiber amplifier 2 using the light intensity of each optical signal measured by the optical spectrum analyzer 34.

Detailed procedures (1) to (9) of calculating the gain G and noise figure NF of the optical fiber amplifier 2 using the optical amplifier evaluation apparatus with this arrangement will be sequentially explained.

(1) Measurement of Reference Light Intensity $P_{ref}$ and Calibration of Resolving Power Width A reference light intensity $P_{ref}$ of reference light used to measure an optical loss on each optical path which passes each optical signal in the optical modulation unit 21 is obtained.

More specifically, as shown in FIG. 3, the optical spectrum analyzer 34 is directly connected to the output terminal of an optical fiber amplifier 2 to be measured in a no-input state, and analyzes the spectrum of output light serving as reference light output from the optical fiber amplifier 2 in a no-input state by spontaneous emission described above, thereby measuring the reference light intensity $P_{ref}$ at each wavelength $\lambda$.

As described above, since reference light output from the optical fiber amplifier 2 is generated by spontaneous emission, as shown in FIG. 4, it is free from any polarization component and has an almost flat wavelength characteristic.

In analyzing the spectrum of identical reference light, a light intensity $P_1(\lambda)$ obtained when the wavelength resolving power width of the optical spectrum analyzer 34 is set large, and a light intensity $P_2(\lambda)$ obtained when the wavelength resolving power width is set small for actual use are compared to find that the light intensity $P_1(\lambda)$ for a large set width is higher than the light intensity $P_2(\lambda)$ for a small set width, as shown in FIG. 4.

The precision of resolving power (root-mean-square value) Res1 for a large set width is obtained with a higher precision than the precision of resolving power (root-mean-square value) Res2 for a small set width used for measurement. Thus, the precision of resolving power (root-mean-square value) Res2 for a small set width used for actual measurement is calculated based on equation (3):

$$Res2 = Res1\{P_2(\lambda)/P_1(\lambda)\} \tag{3}$$

Two measurement operations, i.e., measurement when the wavelength resolving power width is set to one used for actual measurement, and measurement when the wavelength resolving power width is set larger than one used for actual measurement are performed to calculate the resolving power (root-mean-square value) Res2 used for actual measurement by equation (3).

(2) Measurement of Optical Loss La on Optical Path from Input Terminal 22 to Output Terminal 26

Figure 5A:
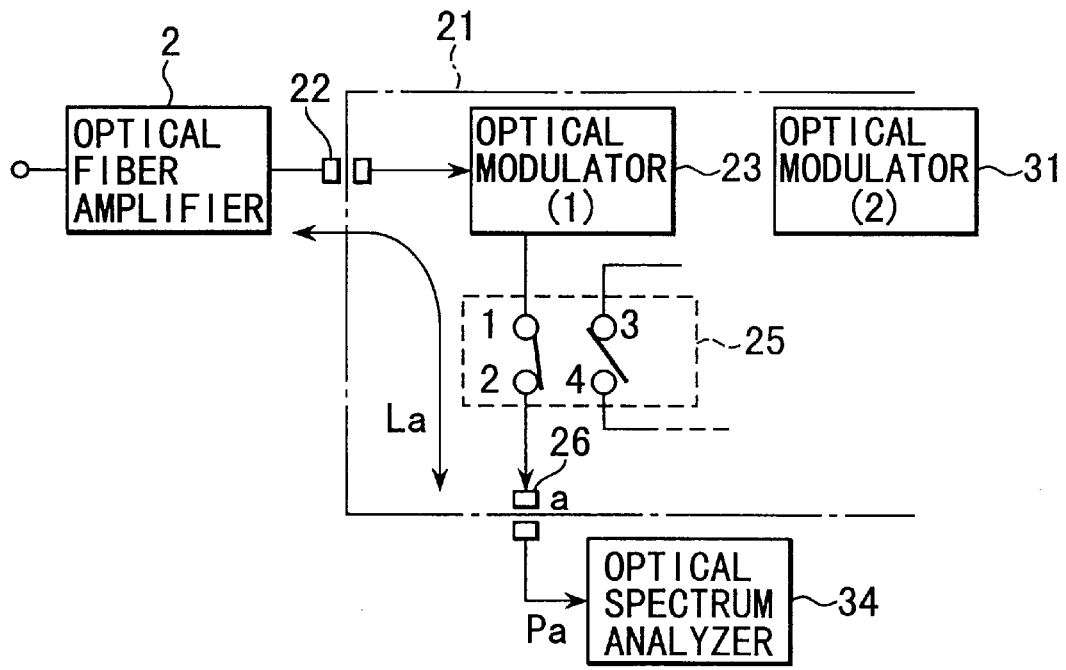
FIG. 5A is a block diagram showing measurement of the optical loss on the optical path in the optical amplifier evaluation method.
Figure 5B:
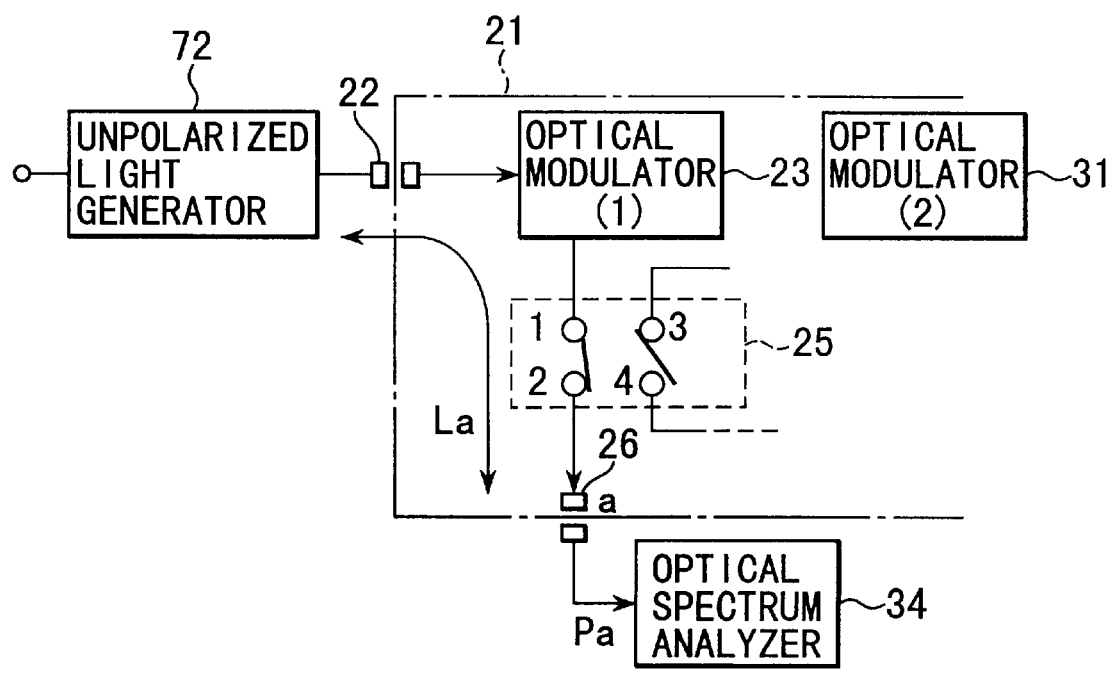
FIG. 5B is a block diagram showing a modification of measurement of the optical loss on the optical path in the optical amplifier evaluation method.

As shown in FIG. 5A, output light from the optical fiber amplifier 2 in a no-input state is applied to the input terminal 22 of the optical modulation unit 21.

The controller 35 is operated to set the optical switch 25 to the "steady state".

In the "steady state", the optical spectrum analyzer 34 is connected to the output terminal 26 of the optical modulation unit 21 to measure a light intensity $Pa(\lambda)$ at each wavelength $\lambda$ of the optical signal having passed from the optical fiber amplifier 2 through the optical path including the first optical modulator 23 and optical switch 25.

Since the light intensity $Pref(\lambda)$ of reference light output from the optical fiber amplifier 2 has already been measured, an optical loss $La(\lambda)$ on this optical path is obtained by equation (4):

$$La(\lambda) = Pa(\lambda)/P_{ref}(\lambda) \tag{4}$$

(3) Measurement of Optical Loss Ld on Optical Path from Input Terminal 22 to Output Terminal 33

Figure 6A:
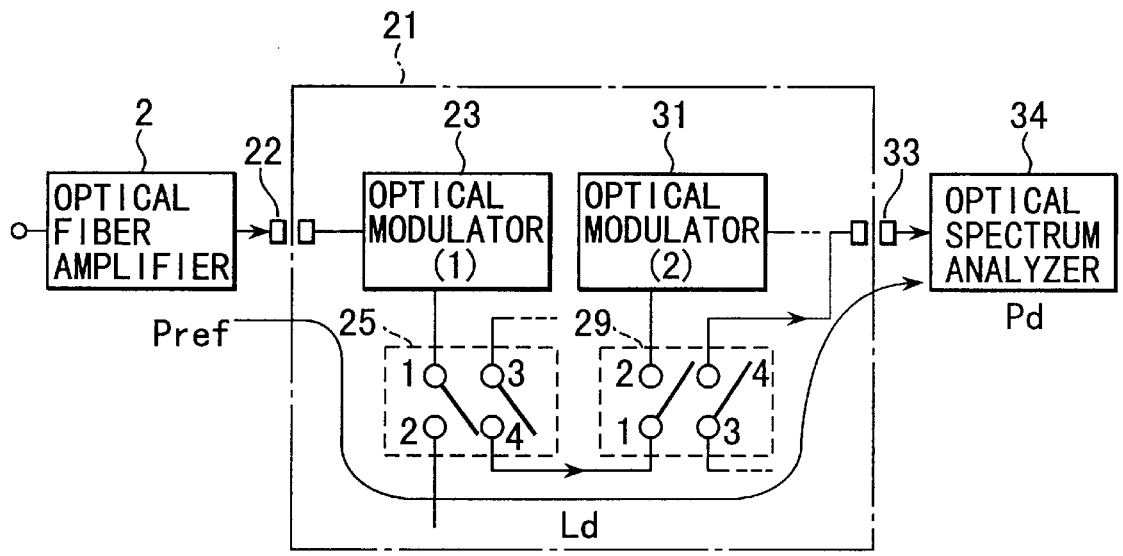
FIG. 6A is a block diagram for explaining measurement of the optical loss on the optical path in the optical amplifier evaluation method.
Figure 6B:
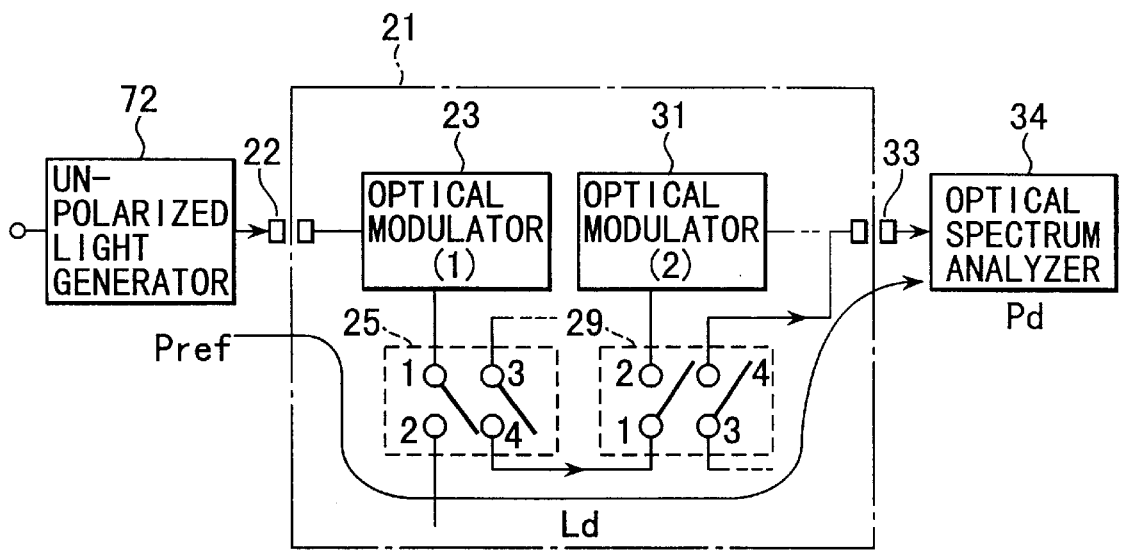
FIG. 6B is a block diagram showing a modification of measurement of the optical loss on the optical path in the optical amplifier evaluation method.

As shown in FIG. 6A, output light from the optical fiber amplifier 2 in a no-input state is applied to the input terminal 22 of the optical modulation unit 21.

The controller 35 is operated to set the optical switches 25 and 29 to the "switching state".

In the "switching state", the optical spectrum analyzer 34 is connected to the output terminal 33 of the optical modulation unit 21 to measure a light intensity $Pd(\lambda)$ at each wavelength $\lambda$ of the optical signal having passed from the optical fiber amplifier 2 through the optical path including the first optical modulator 23 and optical switches 25 and 29.

Since the light intensity $Pref(\lambda)$ of reference light sent from the optical fiber amplifier 2 has already been measured, an optical loss $Ld(\lambda)$ on this optical path is obtained by equation (5):

$$Ld(\lambda) = Pd(\lambda)/P_{ref}(\lambda) \tag{5}$$

(4) Measurement of Optical Loss Lb on Optical Path from Input Terminal 27 to Output Terminal 33

Figure 7A:
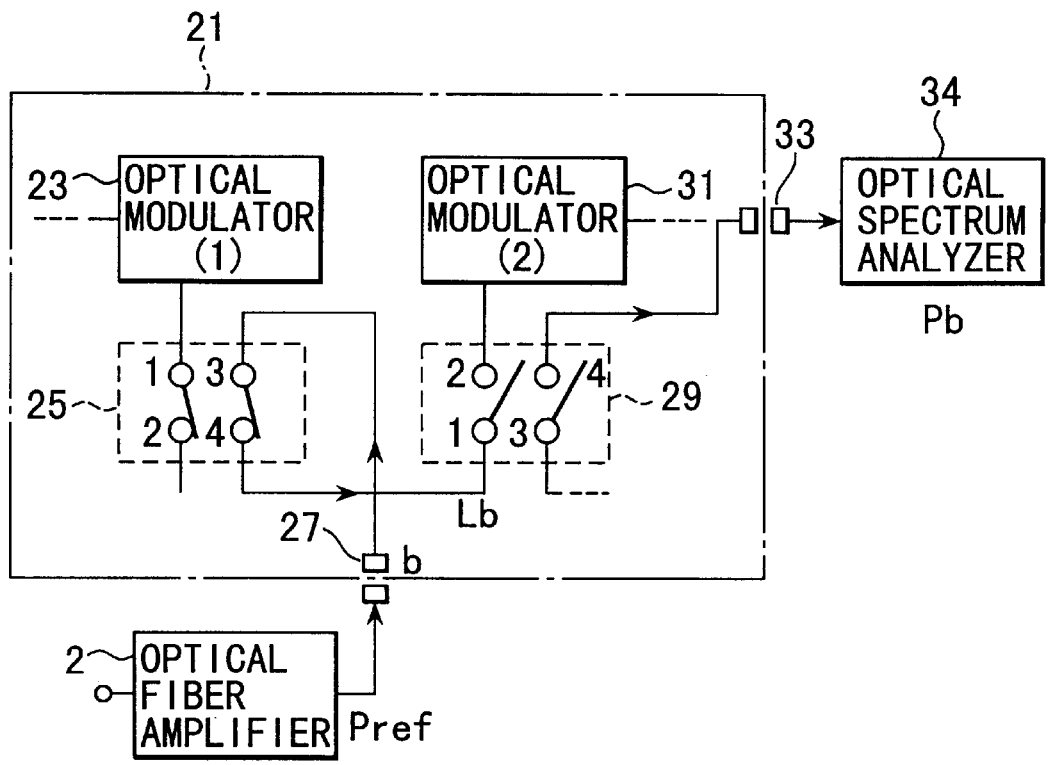
FIG. 7A is a block diagram for explaining measurement of the optical loss on the optical path in the optical amplifier evaluation method.
Figure 7B:
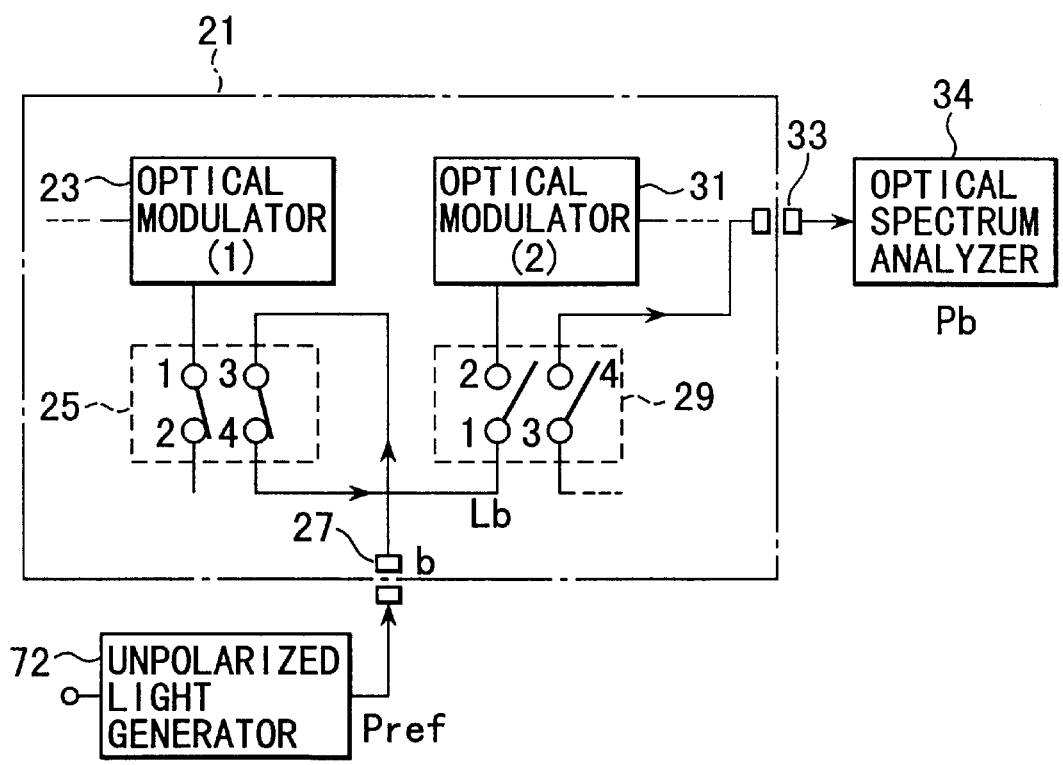
FIG. 7B is a block diagram showing a modification of measurement of the optical loss on the optical path in the optical amplifier evaluation method.

As shown in FIG. 7A, output light from the optical fiber amplifier 2 in a no-input state is applied to the input terminal 27 of the optical modulation unit 21.

The controller 35 is operated to set the optical switch 25 to the "steady state" and the optical switch 29 to the "switching state".

In this state, the optical spectrum analyzer 34 is connected to the output terminal 33 of the optical modulation unit 21 to measure a light intensity $Pb(\lambda)$ at each wavelength $\lambda$ of the optical signal having passed from the optical fiber amplifier 2 through the optical path including only the optical switches 25 and 29.

Since the light intensity $Pref(\lambda)$ of reference light output from the optical fiber amplifier 2 has already been measured, an optical loss $Lb(\lambda)$ on this optical path not including the second optical modulator 31 is obtained by equation (6):

$$Lb(\lambda) = Pb(\lambda)/P_{ref}(\lambda) \tag{6}$$

(5) Measurement of Optical Loss Lc on Optical Path from Input Terminal 27 to Output Terminal 33

Figure 8A:
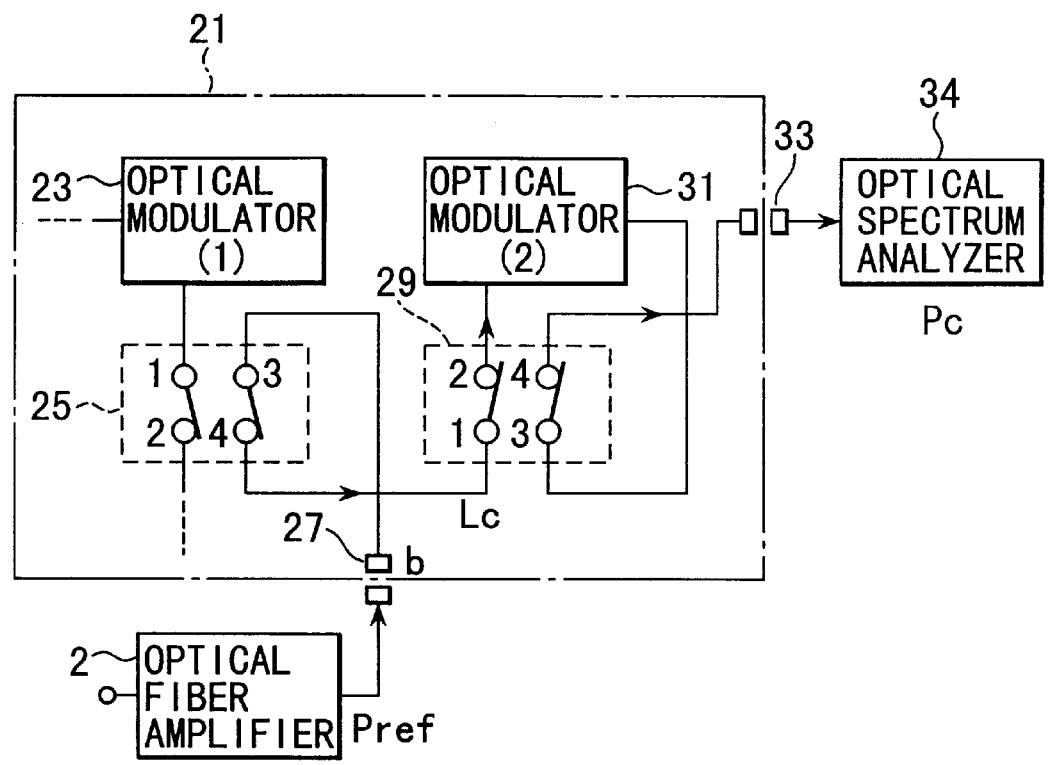
FIG. 8A is a block diagram for explaining measurement of the optical loss on the optical path in the optical amplifier evaluation method.
Figure 8B:
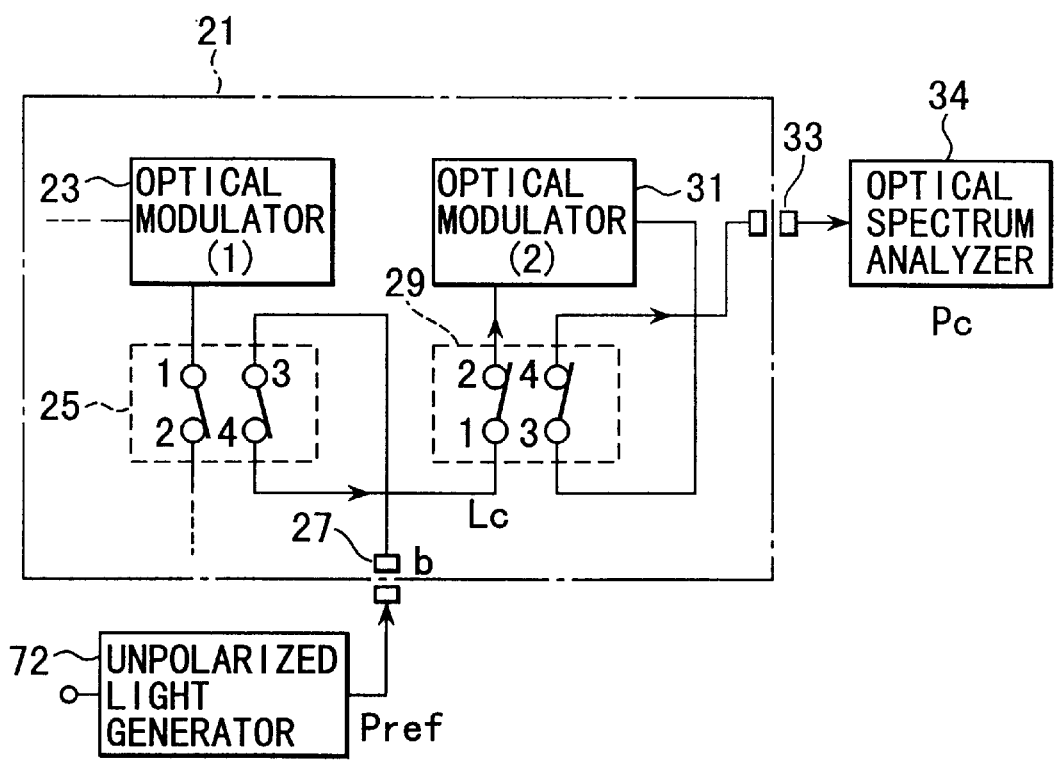
FIG. 8B is a block diagram showing a modification of measurement of the optical loss on the optical path in the optical amplifier evaluation method.

As shown in FIG. 8A, output light from the optical fiber amplifier 2 in a no-input state is applied to the input terminal 27 of the optical modulation unit 21.

The controller 35 is operated to set the optical switches 25 and 29 to the "steady state".

In the "steady state", the optical spectrum analyzer 34 is connected to the output terminal 33 of the optical modulation unit 21 to measure a light intensity Pc($\lambda$) at each wavelength $\lambda$ of the optical signal having passed from the optical fiber amplifier 2 through the optical path including the optical switches 25 and 29 and second optical modulator 31.

Since the light intensity Pref($\lambda$) of reference light output from the optical fiber amplifier 2 has already been measured, an optical loss Lc($\lambda$) on this optical path including the second optical modulator 31 is obtained by equation (7):

$$Lc(\lambda)=Pc(\lambda)/P_{ref}(\lambda) \qquad (7)$$

By detailed procedures (1) to (5) described above, measurement of the optical losses La($\lambda$), Lb($\lambda$), Lc($\lambda$), and Ld($\lambda$) on the respective optical paths formed within the optical modulation unit 21 are complete.

The measured optical losses La($\lambda$) to Ld($\lambda$) on the respective optical paths are stored in a memory device 35a in the controller 35.

The gain G and noise figure NF of the optical fiber amplifier 2 to be measured are measured by the following procedure.

Note that measurement and calculation of the gain G and noise figure NF are automatically performed in accordance with a control program in the controller 35.

The following processing is automatically performed while the laser beam source 1, optical fiber amplifier 2, and optical spectrum analyzer 34 are connected to normal positions in the optical modulation unit 21, as shown in FIG. 1.

(6) Measurement of Input Light Intensity ($P_{IN}$) of Optical Fiber Amplifier 2

Figure 9:
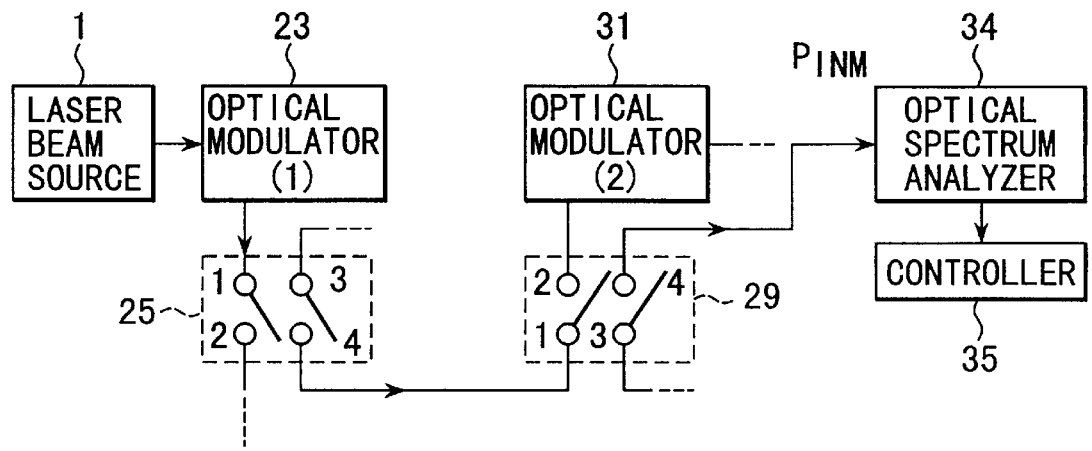
FIG. 9 a block diagram for explaining measurement of the input light intensity to the optical fiber amplifier of the optical amplifier evaluation method.

As shown in FIG. 9, the controller 35 sets the optical switches 25 and 29 to the "switching state", and sends a light intensity measurement instruction to the optical spectrum analyzer 34.

In this state, wavelength-multiplexed light with a plurality of wavelengths $\lambda_1, \lambda_2, \lambda_3, \ldots, \lambda_{n-1}, \lambda_n, \ldots$ (FIG. 12) emitted from the laser beam source 1 is modulated by the first optical modulator 23 into a rectangular optical signal which is enabled/disabled in the predetermined cycle $T_0$, as shown in FIGS. 2A to 2D.

The modulated optical signal is input to the optical spectrum analyzer 34 via the optical switches 25 and 29.

The optical spectrum analyzer 34 analyzes the spectrum of the incident light to obtain a light intensity $P_{INM}$ ($\lambda=\lambda_1, \lambda_2, \lambda_3, \ldots, \lambda_{n-1}, \lambda_n, \ldots$) at each wavelength $\lambda$A.

The optical spectrum analyzer 34 sends and stores the measured light intensity $P_{INM}(\lambda)$ to and in the memory device 35a in the controller 35.

The controller 35 corrects the measured light intensity $P_{INM}(\lambda)$ using the optical losses Ld($\lambda$) and La($\lambda$) measured in advance in accordance with equation (8) to obtain a correct input light intensity $P_{IN}(\lambda)$ for the optical fiber amplifier 2:

$$P_{IN}(\lambda)=P_{INM}(\lambda) \cdot La(\lambda)/Ld(\lambda) \qquad (8)$$

(7) Measurement of Output Light Intensity ($P_{OUT}$) of Optical Fiber Amplifier 2

Figure 10:
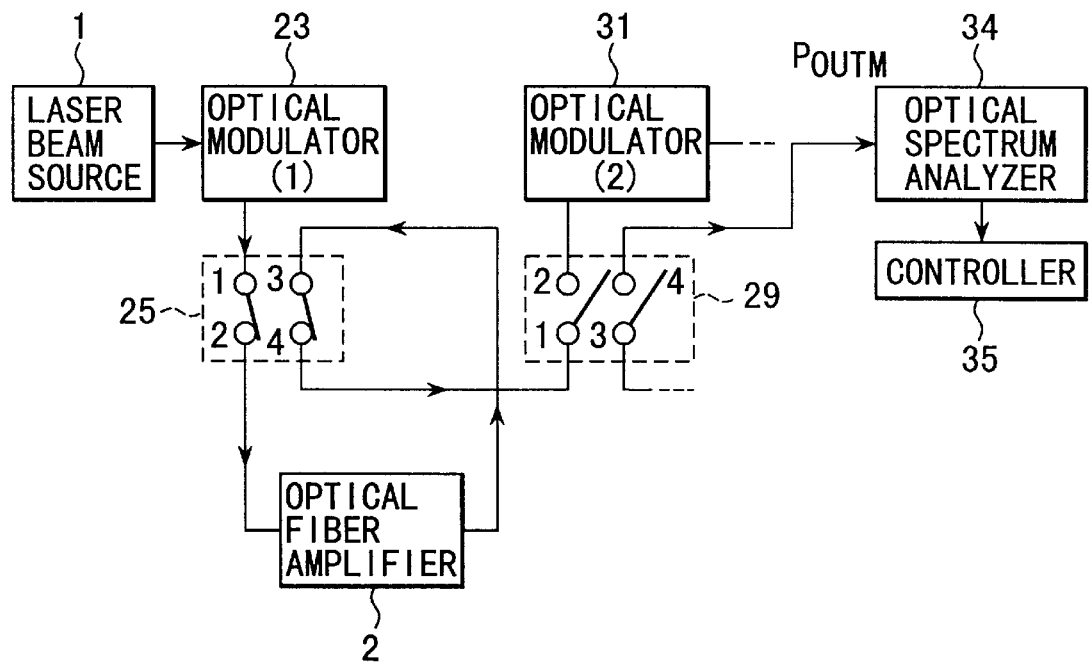
FIG. 10 is a block diagram for explaining measurement of the output light intensity from the optical fiber amplifier in the optical amplifier evaluation method.

As shown in FIG. 10, the controller 35 sets the optical switch 25 to the "steady state" and the optical switch 29 to the "switching state", and sends a light intensity measurement instruction to the optical spectrum analyzer 34.

In this state, wavelength-multiplexed light having a plurality of wavelengths $\lambda_1, \lambda_2, \lambda_3, \ldots, \lambda_{n-1}, \lambda_n, \ldots$ emitted from the laser beam source 1 is modulated by the first optical modulator 23 into a rectangular optical signal which is enabled/disabled in the predetermined cycle $T_0$, as shown in FIG. 2.

The modulated optical signal is input to the optical fiber amplifier 2 to be measured, and amplified.

The optical signal amplified and output from the optical fiber amplifier 2 is directly input to the optical spectrum analyzer 34 via the optical switches 25 and 29.

The optical spectrum analyzer 34 analyzes the spectrum of the incident light to obtain a light intensity $P_{OUTM}$ ($\lambda=\lambda_1, \lambda_2, \lambda_3, \ldots \lambda_{n-1}, \lambda_n, \ldots$) at each wavelength $\lambda$.

The optical spectrum analyzer 34 sends and stores the measured light intensity $P_{OUTM}(\lambda)$ to and in the memory device 35a in the controller 35.

The controller 35 corrects the measured $P_{OUTM}(\lambda)$ using the optical loss Lb($\lambda$) measured in advance in accordance with equation (9) to obtain a correct input light intensity $P_{OUT}(\lambda)$ for the optical fiber amplifier 2:

$$P_{OUT}(\lambda)=P_{OUTM}(\lambda)/Lb(\lambda) \qquad (9)$$

(8) Measurement of ASE Light Intensity ($P_{ASE}$) of Optical Fiber Amplifier 2

Figure 11:
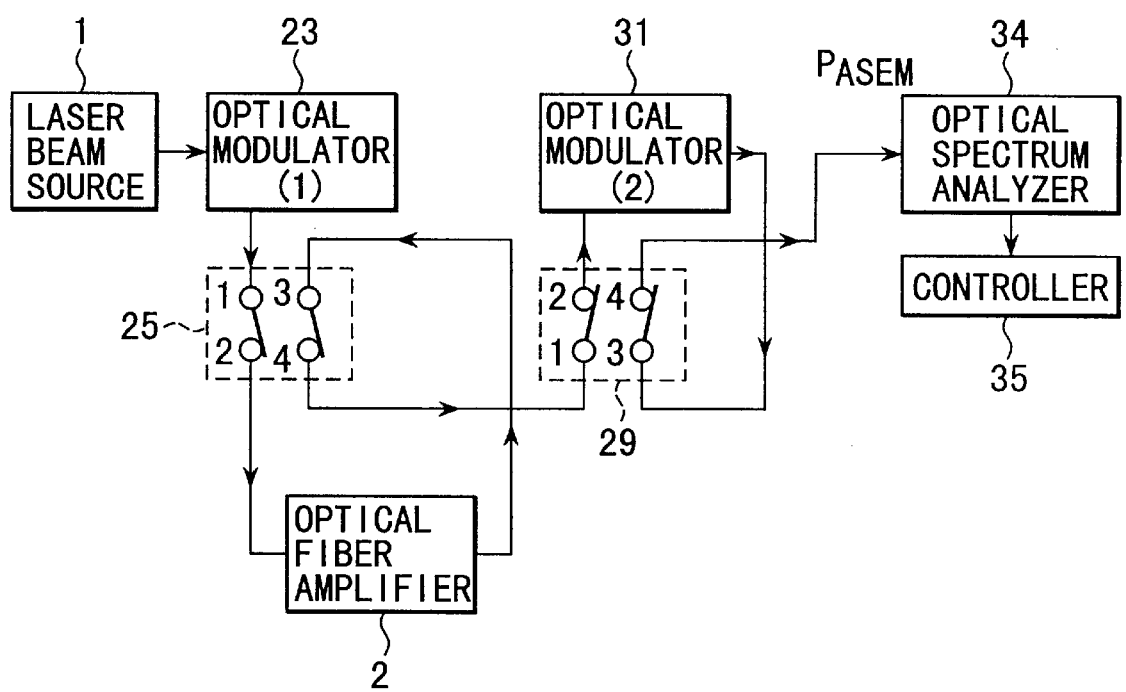
FIG. 11 is a block diagram for explaining measurement of the light intensity of spontaneous emission in the optical fiber amplifier in the optical amplifier evaluation method.

As shown in FIG. 11, the controller 35 sets the optical switches 25 and 29 to the "steady state", and sends a light intensity measurement instruction to the optical spectrum analyzer 34.

In this state, wavelength-multiplexed light having a plurality of wavelengths $\lambda_1, \lambda_2, \lambda_3, \ldots, \lambda_{n-1}, \lambda_n, \ldots$ emitted from the laser beam source 1 is modulated by the first optical modulator 23 into a rectangular optical signal which is enabled/disabled in the predetermined cycle $T_0$, as shown in FIGS. 2A and 2B.

The modulated optical signal is input to the optical fiber amplifier 2 to be measured, and amplified.

The optical signal amplified and output from the optical fiber amplifier 2 is input to the second optical modulator 31 via the optical switches 25 and 29.

The amplified optical signal input to the second optical modulator 31 is extracted by only the partial period $T_A$ of the OFF period, and the extracted signal is input to the optical spectrum analyzer 34 via the optical switch 29.

The optical spectrum analyzer 34 regards, as spontaneous emission (ASE), the optical signal in the partial period $T_A$ of the OFF period of the input, amplified optical signal, thereby obtaining a light intensity $P_{ASEM}$ ($\lambda=\lambda_1, \lambda_2, \lambda_3, \ldots, \lambda_{n-1}, \lambda_n, \ldots$) at each wavelength $\lambda$ of the spontaneous emission.

The optical spectrum analyzer 34 sends and stores the measured light intensity $P_{ASEM}(\lambda)$ to and in the memory device 35a within the controller 35.

The controller 35 corrects the measured $P_{ASEM}(\lambda)$ using the optical loss Lc($\lambda$) measured in advance in accordance with equation (10) to obtain a correct input light intensity $P_{ASE}(\lambda)$ of the spontaneous emission (ASE) in the optical fiber amplifier 2:

$$P_{ASE}(\lambda)=P_{ASEM}(\lambda)/Lc(\lambda) \qquad (10)$$

(9) Calculation of Gain G and Noise Figure NF of Optical Fiber Amplifier 2

The controller 35 calculates the gain G($\lambda$) and noise figure NF($\lambda$) of the optical fiber amplifier 2 using the corrected input light intensity $P_{IN}(\lambda)$, output light intensity $P_{OUT}(\lambda)$, and light intensity $P_{ASE}(\lambda)$ of spontaneous emission (ASE) in accordance with equations (2)' and (1)' identical to the above equations (2) and (1):

$$G(\lambda)=P_{OUT}(\lambda)/P_{IN}(\lambda) \qquad (2)'$$

$$NF(\lambda)=P_{ASE}(\lambda)/[h \cdot v \cdot G \cdot \Delta v] \qquad (1)'$$

In the optical amplifier evaluation apparatus of the first embodiment having this arrangement, the optical losses La(λ), Lb(λ), Lc(λ), and Ld(λ) on the respective paths shown in FIGS. 5A, 6A, 7A, and 8A which are formed within the optical modulation unit 21 for passing through an optical signal must be obtained to calculate the gain G(λ) while the input light intensity $P_{IN}(\lambda)$ and output light intensity $P_{OUT}(\lambda)$ to and from the optical fiber amplifier 2 are obtained and while the light intensity $P_{ASE}(\lambda)$ of spontaneous emission (ASE) is obtained.

The first embodiment adopts as reference light input to each optical path output light from the optical fiber amplifier 2 in a no-input state in place of a laser beam from the laser beam source 1.

Since the output light from the optical fiber amplifier 2 in a no-input state is generated by spontaneous emission (ASE), it does not have any polarization characteristics, and has almost flat wavelength characteristics.

To the contrary, light output from various light sources including the laser beam source 1 for outputting light suitable for a measurement optical. signal having a single or plurality of wavelengths suited for coherent measurement has polarization characteristics and varies in polarization direction.

With the use of output light from the optical fiber amplifier 2 without any polarization characteristics, even if an optical component such as an optical modulator in which the light intensity of output light changes in accordance with the polarization direction of input light is interposed on each optical path, the light intensity of an optical signal output from this optical component maintains a constant value.

In the first embodiment, since the constant, correct optical losses La(λ), Lb(λ), Lc(λ), and Ld(λ) can always be measured, the measurement precision of the light intensities $P_{IN}(\lambda)$, $P_{OUT}(\lambda)$, and $P_{ASE}(\lambda)$ described above can greatly increase.

The second optical modulator 31 functioning to extract an optical signal in the partial period $T_A$ of the OFF period of an optical signal output from the optical fiber amplifier 2 effectively operates only in obtaining the light intensity $P_{ASE}$ of spontaneous emission (ASE) in the optical fiber amplifier 2.

However, the second optical modulator 31 is not particularly necessary for obtaining the gain G(λ) of the optical fiber amplifier 2.

Measurement of the output light intensity $P_{OUT}(\lambda)$ for calculating the gain G(λ) can therefore use an optical path on which the second optical modulator 31 is bypassed.

In the first embodiment, since both optical components included in optical paths for input and output optical signals to and from the optical fiber amplifier 2 can be limited to the first optical modulator 23, the measurement error amount caused by the first optical modulator 23 can be canceled in calculation of the gain G to increase the measurement precision of the gain G.

In the first embodiment, the controller 35 automatically switches the optical switches 25 and 29, instructs measurement of each light intensity in the optical spectrum analyzer 34, corrects each measured light intensity using the optical loss, and calculates the gain G and noise figure NF of the optical fiber amplifier 2 at last. The evaluation efficiency for the optical fiber amplifier 2 to be measured can considerably increase.

The calibration value of the set frequency resolving power width in the optical spectrum analyzer 34 is obtained from the ratio of level values for large and small set frequency resolving power widths.

Calibrating the set frequency resolving power value in this manner yields a higher likelihood ratio of the resolving power than in a conventional method in which no calibration is performed.

In the first embodiment, the measurement precision of the noise figure NF can further increase.

Note that in the above-described first embodiment, an unpolarized light generator 72 may replace the optical fiber amplifier 2 in detailed procedures (2) to (5), as shown in FIGS. 5B, 6B, 7B, and 8B.

(Second Embodiment)

Figure 13A:
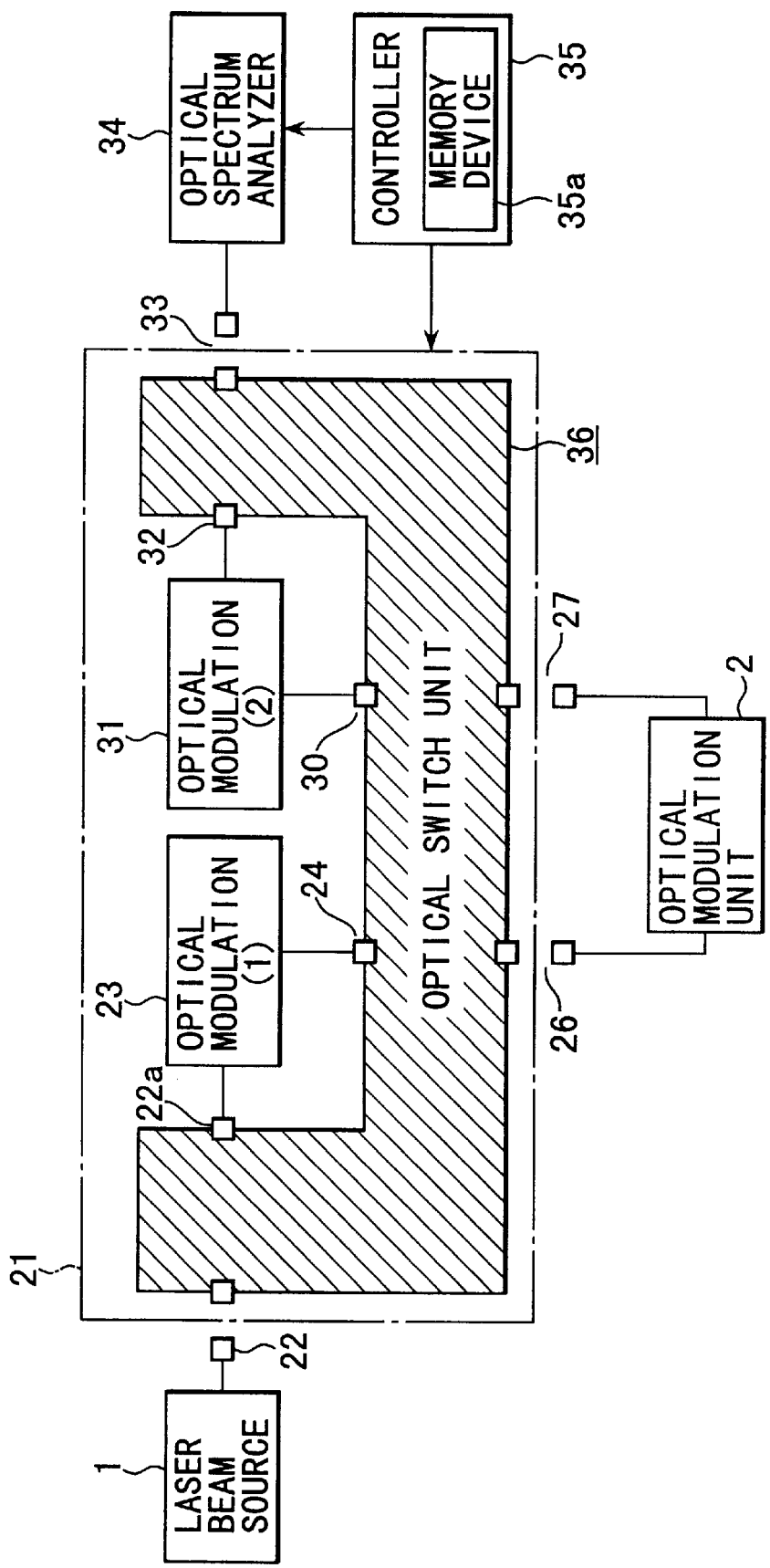
FIG. 13A is a block diagram showing the schematic arrangement of an optical amplifier evaluation apparatus to which an optical amplifier evaluation method according to the second embodiment of the present invention is applied.

FIG. 13A is a block diagram showing the schematic arrangement of an optical amplifier evaluation apparatus according to the second embodiment of the present invention.

In FIG. 13A, the same reference numerals as in the optical amplifier evaluation apparatus of the first embodiment shown in FIG. 1 denote the same parts, and a detailed description of the repetitive parts will be omitted.

Instead of the two optical switches 25 and 29 in the first embodiment shown in FIG. 1, one optical switch unit 36 is incorporated in an optical modulation unit 21 in the optical amplifier evaluation apparatus of the second embodiment.

The optical switch unit 36 comprises a total of eight terminals, i.e., an input terminal 22 of a laser beam source 1 to the optical modulation unit 21, an output terminal 26 to an optical fiber amplifier 2, an input terminal 27 from the optical fiber amplifier 2, an output terminal 33 to an optical spectrum analyzer 34, an input terminal 22a to a first optical modulator 23, an output terminal 24 from the first optical modulator 23, an input terminal 30 to a second optical modulator 31, and an output terminal 32 from the second optical modulator 31.

Connection between the terminals incorporated in the optical switch unit 36 is arbitrarily switched by a controller 35.

Accordingly, the controller 35 can measure the above-mentioned optical losses La(λ), Lb(λ), Lc(λ),; and Ld(λ) and light intensities $P_{INM}(\lambda)$, $P_{OUTM}(\lambda)$, and $P_{ASEM}(\lambda)$ by connecting the terminals of the optical switch unit 36 so as to form the respective optical paths described in the detailed procedures (1) to (9) of the first embodiment.

The second embodiments can attain almost the same effects as those of the optical amplifier evaluation apparatus of the first embodiment.

Further, in the second embodiment, even when the optical losses La(λ), Lb(λ), Lc(λ), and Ld(λ) are to be measured, the optical paths shown in FIGS. 3, 5A, 6A, 7A, and 8A and connection to the optical fiber amplifier 2 and optical spectrum analyzer 34 can be realized by only switching the optical switch unit 36. The measurement efficiency for the optical losses La(λ) to Ld(λ) can increase.

Figure 13B:
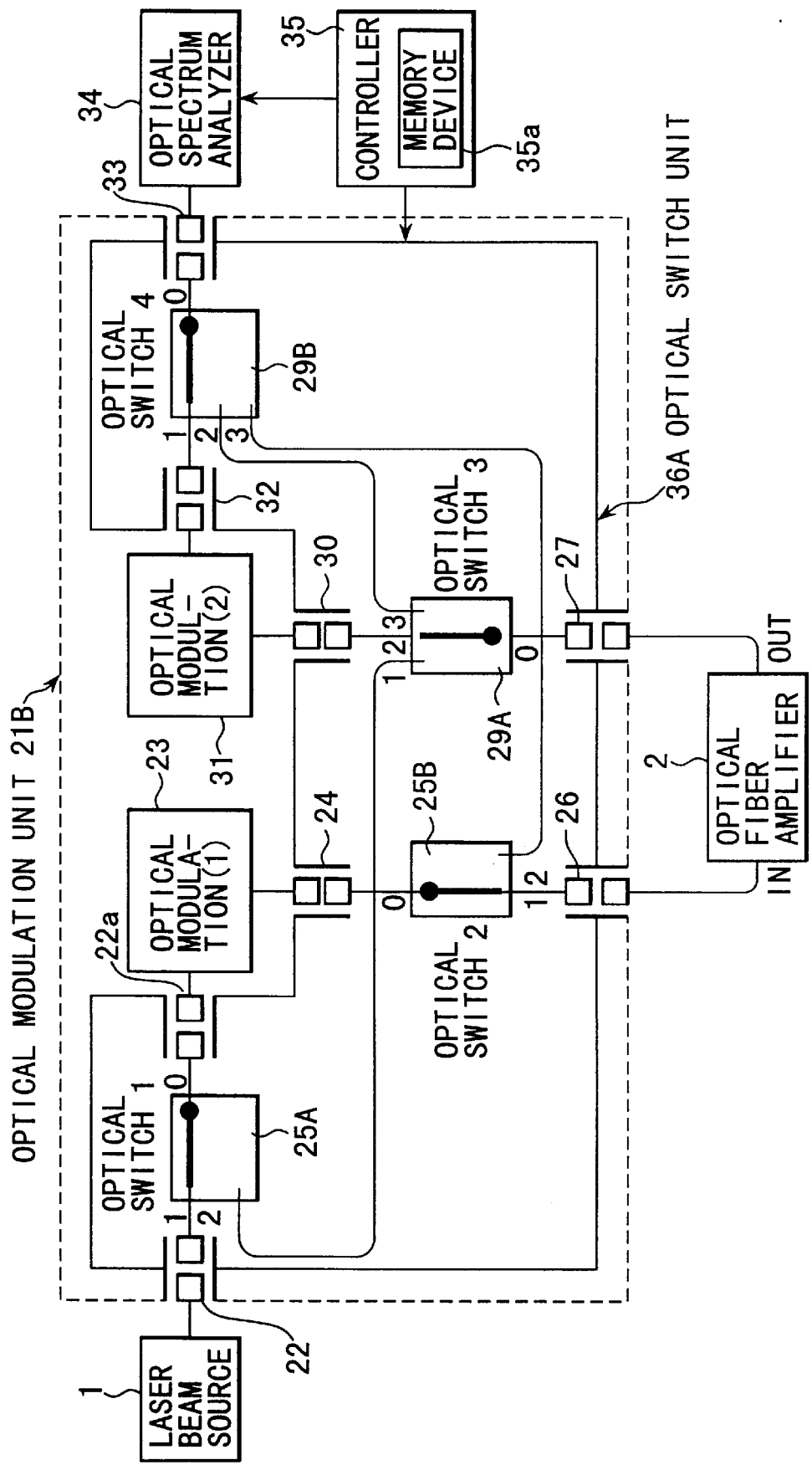
FIG. 13B is a block diagram showing the detailed arrangement of the optical amplifier evaluation apparatus to which the optical amplifier evaluation method according to the second embodiment of the present invention is applied.
Figure 14:
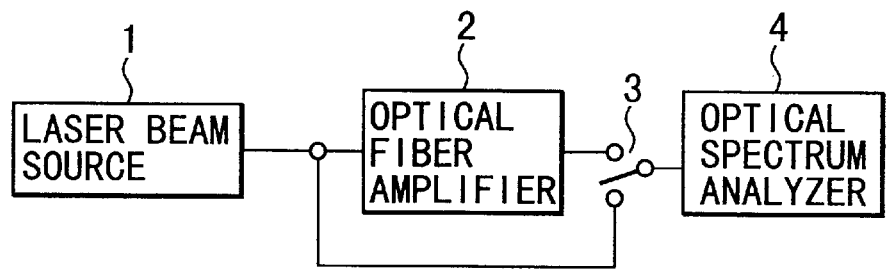
FIG. 14 is a block diagram for explaining a conventional optical fiber amplifier evaluation method.
Figure 15:
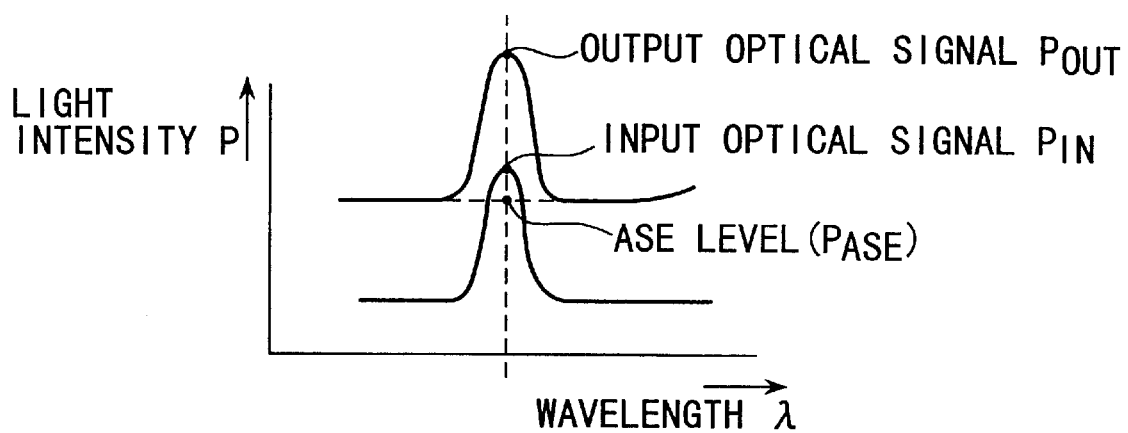
FIG. 15 is a waveform chart showing the relationship between the light intensities of input light, output light, and spontaneous emission in the optical fiber amplifier.

FIG. 13B is a block diagram showing the detailed arrangement of the optical amplifier evaluation apparatus to which an optical amplifier evaluation method according to the second embodiment of the present invention is applied.

In FIG. 13B, the same reference numerals as in the optical amplifier evaluation apparatus of the second embodiment shown in FIG. 13A denote the same parts, and a detailed description of the repetitive parts will be omitted.

In FIG. 13B, an optical switch unit 36A of an optical modulation unit 21B comprises a first optical switch 25A arranged between the input terminal 22 to the optical modulation unit 21 and the input terminal 22a to the first optical modulator 23, a second optical switch 25B arranged between the output terminal 24 from the first optical modulator 23 and the output terminal 26 to the optical fiber amplifier 2, a third optical switch 29A arranged between the input terminal 27 from the optical fiber amplifier 2 and the input terminal 30 to the second optical modulator 31, and a fourth optical switch 29B arranged between the output terminal 32 from the second optical modulator 31 and the output terminal 33 to the optical spectrum analyzer 34.

Each of the first and second optical switches 25A and 25B has a total of three, port 0 to port 2 which are switched by the external controller 35.

Each of the third and fourth optical switches 29A and 29B has a total of four, port 0 to port 3 which are switched by the external controller 35.

Calibration (loss measurement) and measurement procedures in the optical modulation unit 21B having this arrangement will be explained.

Losses to be calibrated within the optical modulation unit 21B will be listed.

In the following description, the first, second, third, and fourth optical switches 25A, 25B, 29A, and 29B will be referred to as optical switches 1, 2, 3, and 4, and the first and second optical modulators 23 and 31 will be referred to as optical modulators 1 and 2.

① (Lao1($\lambda$): loss of optical modulator 1)
② Lao2($\lambda$): loss of optical modulator 2
③ Ls11($\lambda$): loss between port 1 and port 0 of optical switch 1
④ Ls12($\lambda$): loss between port 2 and port 0 of optical switch 1
⑤ Ls21($\lambda$): loss between port 1 and port 0 of optical switch 2
⑥ Ls22($\lambda$): loss between port 2 and port 0 of optical switch 2
⑦ Ls31($\lambda$): loss between port 1 and port 0 of optical switch 3
⑧ Ls32($\lambda$): loss between port 2 and port 0 of optical switch 3
⑨ Ls33($\lambda$): loss between port 3 and port 0 of optical switch 3
⑩ Ls41($\lambda$): loss between port 1 and port 0 of optical switch 4
Ls42($\lambda$): loss between port 2 and port 0 of optical switch 4
Ls43($\lambda$): loss between port 3 and port 0 of optical switch 4

Of these losses, ③k are losses in optical switches 1, 2, 3, and 4.

Each of optical switches 1, 2, 3, and 4 has a mechanical structure in which the optical path is switched by changing the direction of a reflecting mirror by, e.g., a solenoid.

Since the loss characteristics of optical switches 1, 2, 3, and 4 are very stable, they need not be calibrated by the measurer and suffice to be measured only once after formation of the optical modulation unit 21B and stored in a memory device 35a within the controller 35.

However, the loss characteristics of an optical modulator using an acoustooptical element or the like are easily influenced by the environment, so that calibration (loss measurement) is performed by the measurer before the start of measurement.

Value ① is not used in correction and need not be subjected to calibration (loss measurement).

The calibration procedure will be explained. First, the resolving power width is calibrated.

The controller 35 sets optical switches 1 to 4 at positions where ports 2, 2, 3, and 2 are connected to corresponding port 0 (in order to set the optical fiber amplifier 2 in a no-input state), sets a resolving power width $\Delta v_0$ having a high likelihood ratio of resolving power in the optical spectrum analyzer 34, and measures and stores a power $Pv_0(\lambda)$ in the memory device 35a in the controller 35.

While keeping the settings for optical switches 1 to 4 unchanged, the controller 35 sets the resolving power of the optical spectrum analyzer 34 to a resolving power width $\Delta v_1$ for actual measurement, and measures and stores a power $Pv_1(\lambda)$ in the memory device 35a in the controller 35.

A resolving power width $\Delta v(\lambda)$ is calculated by equation (11):

$$\Delta v(\lambda)=\Delta v_0(\lambda)\times Pv_1(\lambda)/Pv_0(\lambda) \tag{11}$$

The calibration procedure will be explained.

(a) The controller 35 sets optical switches 1, 2, 3, and 4 at positions where ports 2, 2, 3, and 2 are connected to corresponding port 0 (in order to set the optical fiber amplifier 2 in a no-input state), measures a reference level Pref($\lambda$) by the optical spectrum analyzer 34, and stores it in the memory device 35a in the controller 35.

(b) The controller 35 sets optical switches 1, 2, 3, and 4 at positions where ports 1, 2, 2, and 1 are connected to corresponding port 0, measures a power P1($\lambda$) by the optical spectrum analyzer, and stores it in the memory device 35a in the controller 35.

(c) The controller 35 calculates Lao2($\lambda$) by equation (12) and stores it in the memory device 35a in the controller 35:

$$Lao2(\lambda)=\{Pref(\lambda)+Ls33(\lambda)+Ls42(\lambda)\}-\{P1(\lambda)+Ls32(\lambda)+Ls41(\lambda)\} \tag{12}$$

The measurement procedure will be described.

(d) The controller 35 sets optical switches 1, 2, 3, and 4 at positions where ports 1, 2, 2, and 3 are connected to corresponding port 0, measures a power P3($\lambda$) by the optical spectrum analyzer 34, and stores it in the memory device 35a in the controller 35.

(e) The controller 35 calculates an input light power Pin by equation (13) and stores it in the memory device 35a in the controller 35:

$$Pin=P3(\lambda)+Ls22+Ls43-Ls21 \tag{13}$$

(f) The controller 35 sets optical switches 1, 2, 3, and 4 at positions where ports 1, 1, 2, and 1 are connected to corresponding port 0, measures a power P4($\lambda$) by the optical spectrum analyzer 34, and stores it in the memory device 35a in the controller 35.

(g) The controller 35 calculates a spontaneous emission power Pase by equation (14) and stores it in the memory device 35a in the controller 35:

$$Pase=P4(\lambda)-Lao2-Ls32-Ls41 \tag{14}$$

(h) The controller 35 sets optical switches 1, 2, 3, and 4 at positions where ports 1, 1, 3, and 2 are connected to corresponding port 0, measures a power P5($\lambda$) by the optical spectrum analyzer 34, and stores it in the memory device 35a in the controller 35.

(i) The controller 35 calculates an output light power Pout by equation (15) and stores it in the memory device 35a in the controller 35:

$$Pout=P5(\lambda)-Ls33-Ls42 \tag{15}$$

(j) The controller 35 calculates the gain G by equation (16) and stores it in the memory device 35a in the controller 35:

$$G=\{Pout(\lambda)-Pase(\lambda)\}/Pin(\lambda) \tag{16}$$

(k) The controller 35 calculates the noise figure NF by equation (17) and stores it in the memory device 35a in the controller 35:

$$NF=NF\{G.Pase, \Delta v, \lambda\} \tag{17}$$

Also in the second embodiment, the unpolarized light generator 72 may replace the optical fiber amplifier 2 in measurement corresponding to detailed procedures (2) to (5) in the first embodiment, as shown in FIGS. 5B, 6B, 7B, and 8B of the first embodiment.

As has been described above, in the optical amplifier evaluation method and apparatus of the present invention, optical losses on respective optical paths for input and output optical signals to and from the optical fiber amplifier are measured using output light from the optical fiber amplifier in a no-input state.

In the optical amplifier evaluation method and apparatus of the present invention, optical losses on the respective optical paths can be measured with high precision, and the light intensities of input light and output light to and from the optical fiber amplifier can be measured with high precision. Therefore, the measurement precisions of the gain and light intensity of spontaneous emission in the optical fiber amplifier can increase to evaluate the noise figure with high precision.

In the optical amplifier evaluation method and apparatus of the present invention, the second optical modulator is bypassed on an optical path in gain measurement.

Consequently, in the optical amplifier evaluation method and apparatus of the present invention, the measurement precision of the gain of the optical fiber amplifier can further increase.

Moreover, in the optical amplifier evaluation method and apparatus of the present invention, the set frequency (wavelength) resolving power width in the optical spectrum analyzer is calibrated.

As a result, in the optical amplifier evaluation method and apparatus of the present invention, a high likelihood ratio of the resolving power can be attained to increase the measurement precision of the noise figure in the optical fiber amplifier that is calculated using the set frequency (wavelength) resolving power width.

What is claimed is:

1. An optical amplifier evaluation method comprising:

modulating light output from a light source into a rectangular optical signal having predetermined ON and OFF periods by a first optical modulator;

applying the optical signal modulated by said first optical modulator to an optical fiber amplifier to be evaluated;

passing the optical signal output from said optical fiber amplifier to be evaluated through a second optical modulator only during a given period in the OFF period of the optical signal modulated by said first optical modulator, thereby measuring a light intensity $P_{ASE}$ of spontaneous emission in said optical fiber amplifier by a light intensity measurement device;

obtaining an optical loss on an optical path extending from said optical fiber amplifier to said light intensity measurement device using output light from said optical fiber amplifier in a no-input state, and correcting, using the obtained optical loss, the light intensity $P_{ASE}$ of spontaneous emission in said optical fiber amplifier that is measured by said light intensity measurement device; and obtaining a noise figure NF of an optical signal in said optical fiber amplifier using a corrected light intensity $P_{ASE}'$ of spontaneous emission in said optical fiber amplifier in accordance with the following equation:

$$NF = P_{ASE}'/(h \cdot v \cdot G \cdot \Delta v)$$

where h: Planck's constant v: light frequency of input optical signal

G: gain $\Delta v$: measurement frequency resolving power width (measurement frequency width) of said light intensity measurement device.

2. An optical amplifier evaluation method according to claim 1, further comprising:

measuring a light intensity in the ON period of the optical signal input to said optical fiber amplifier by said light intensity measurement device;

measuring a light intensity in the ON period of an optical signal output from said optical fiber amplifier by said light intensity measurement device; and obtaining the gain G of said optical fiber amplifier from the light intensities in the ON periods of the optical signals input to and output from said optical fiber amplifier that are measured by said light intensity measurement device.

3. An optical amplifier evaluation method comprising:

modulating light output from a light source into a rectangular optical signal having predetermined ON and OFF periods by a first optical modulator;

applying the optical signal modulated by said first optical modulator to an optical fiber amplifier to be evaluated;

passing the optical signal output from said optical fiber amplifier to be evaluated through a second optical modulator only during a given period in the OFF period of the optical signal modulated by said first optical modulator, thereby measuring a light intensity $P_{ASE}$ of spontaneous emission in said optical fiber amplifier by a light intensity measurement device;

obtaining an optical loss on an optical path extending from said optical fiber amplifier to said light intensity measurement device using output light from said optical fiber amplifier in a no-input state, and correcting, using the obtained optical loss, the light intensity $P_{ASE}$ of spontaneous emission in said optical fiber amplifier that is measured by said light intensity measurement device;

obtaining a noise figure NF of an optical signal in said optical fiber amplifier using a corrected light intensity $P_{ASE}'$ of spontaneous emission in said optical fiber amplifier in accordance with the following equation:

$$NF = P_{ASE}'/(h \cdot v \cdot G \cdot \Delta v)$$

where h: Planck's constant v: light frequency of input optical signal

G: gain $\Delta v$: measurement frequency resolving power width (measurement frequency width) of said light intensity measurement device; and using an optical spectrum analyzer as said light intensity measurement device, and analyzing a spectrum of output light from said optical fiber amplifier in a no-input state by said optical spectrum analyzer, thereby obtaining a calibration value of a set frequency resolving power width used as the measurement frequency resolving power width (measurement frequency width) $\Delta v$ of said light intensity measurement device from a ratio of level values of a spectrum for large and small set frequency resolving power widths.

4. An optical amplifier evaluation method comprising:

modulating light output from a light source into a rectangular optical signal having predetermined ON and OFF periods by a first optical modulator;

applying the optical signal modulated by said first optical modulator to an optical fiber amplifier to be evaluated;

passing the optical signal output from said optical fiber amplifier to be evaluated through a second optical modulator only during a given period in the OFF period of the optical signal modulated by said first optical modulator, thereby measuring a light intensity $P_{ASE}$ of spontaneous emission in said optical fiber amplifier by a light intensity measurement device;

obtaining an optical loss on an optical path extending from said optical fiber amplifier to said light intensity measurement device using output light from said optical fiber amplifier in a no-input state, and correcting, using the obtained optical loss, the light intensity $P_{ASE}$ of spontaneous emission in said optical fiber amplifier that is measured by said light intensity measurement device;

obtaining a noise figure NF of an optical signal in said optical fiber amplifier using a corrected light intensity $P_{ASE}'$ of spontaneous emission in said optical fiber amplifier in accordance with the following equation:

$$NF = P_{ASE}'/(h \cdot v \cdot G \cdot \Delta v)$$

where h: Planck's constant v: light frequency of input optical signal

G: gain $\Delta v$: measurement frequency resolving power width (measurement frequency width) of said light intensity measurement device;

measuring a light intensity in the ON period of the optical signal input to said optical fiber amplifier by said light intensity measurement device;

measuring a light intensity in the ON period of an optical signal output from said optical fiber amplifier by said light intensity measurement device;

obtaining the gain G of said optical fiber amplifier from the light intensities in the ON periods of the optical signals input to and output from said optical fiber amplifier that are measured by said light intensity measurement device;

obtaining an optical loss on an optical path extending from said light source to said optical fiber amplifier using output light from said optical fiber amplifier in a no-input state, and correcting, using the obtained optical loss, the light intensity in the ON period of the optical signal input to said optical fiber amplifier that is measured by said light intensity measurement device; and obtaining an optical loss on an optical path extending from said optical fiber amplifier to the light intensity measurement position using output light from said optical fiber amplifier in a no-input state, and correcting, using the obtained optical loss, the light intensity in the ON period of the optical signal output from said optical fiber amplifier that is measured by said light intensity measurement device, and wherein the gain G of said optical fiber amplifier is obtained from the corrected light intensities in the ON periods of the optical signals input to and output from said optical fiber amplifier.

5. An optical amplifier evaluation method comprising:

modulating light output from a light source into a rectangular optical signal having predetermined ON and OFF periods by a first optical modulator;

applying the optical signal modulated by said first optical modulator to an optical fiber amplifier to be evaluated;

passing the optical signal output from said optical fiber amplifier to be evaluated through a second optical modulator only during a given period in the OFF period of the optical signal modulated by said first optical modulator, thereby measuring a light intensity $P_{ASEM}$ of spontaneous emission in said optical fiber amplifier by a light intensity measurement device;

obtaining an optical loss on an optical path extending from said optical fiber amplifier to said light intensity measurement device using output light from said optical fiber amplifier in a no-input state, and correcting, using the obtained optical loss, the light intensity $P_{ASE}$ of spontaneous emission in said optical fiber amplifier that is measured by said light intensity measurement device;

obtaining a noise figure NF of an optical signal in said optical fiber amplifier using a corrected light intensity $P_{ASE}'$ of spontaneous emission in said optical fiber amplifier in accordance with the following equation:

$$NF = P_{ASE}'/(h \cdot v \cdot G \cdot \Delta v)$$

where h: Planck's constant v: light frequency of input optical signal

G: gain $\Delta v$: measurement frequency resolving power width (measurement frequency width) of said light intensity measurement device; and measuring a light intensity in the ON period of the optical signal input to said optical fiber amplifier by said light intensity measurement device;

measuring a light intensity in the ON period of an optical signal output from said optical fiber amplifier by said light intensity measurement device;

obtaining the gain G of said optical fiber amplifier from the light intensities in the ON periods of the optical signals input to and output from said optical fiber amplifier that are measured by said light intensity measurement device; and using an optical spectrum analyzer as said light intensity measurement device, and analyzing a spectrum of output light from said optical fiber amplifier in a no-input state by said optical spectrum analyzer, thereby obtaining a calibration value of a set frequency resolving power width used as the measurement frequency resolving power width (measurement frequency width) $\Delta v$ of said light intensity measurement device from a ratio of level values of a spectrum for large and small set frequency resolving power widths.

6. An optical amplifier evaluation method according to claim 5, wherein the step of obtaining the gain G of said optical fiber amplifier comprises:

obtaining an optical loss on an optical path extending from said light source to said optical fiber amplifier using output light from said optical fiber amplifier in a no-input state, and correcting, using the obtained optical loss, the light intensity in the ON period of the optical signal input to said optical fiber amplifier that is measured by said light intensity measurement device; and obtaining an optical loss on an optical path extending from said optical fiber amplifier to the light intensity measurement position using output light from said optical fiber amplifier in a no-input state, and correcting, using the obtained optical loss, the light intensity in the ON period of the optical signal output from said optical fiber amplifier that is measured by said light intensity measurement device, and wherein the gain G of said optical fiber amplifier is obtained from the corrected light intensities in the ON periods of the optical signals input to and output from said optical fiber amplifier.

7. An optical amplifier evaluation apparatus comprising:

a first optical modulator for modulating light output from a light source into a rectangular optical signal having predetermined ON and OFF periods;

the optical signal modulated by said first optical modulator being applied to an optical fiber amplifier to be evaluated;

a light intensity measurement device for passing the optical signal output from said optical fiber amplifier through a second optical modulator only during a given period in the OFF period of the optical signal modulated by said first optical modulator, thereby measuring a light intensity $P_{ASE}$ of spontaneous emission in said optical fiber amplifier;

means for obtaining an optical loss on an optical path extending from said optical fiber amplifier to said light intensity measurement device using output light from said optical fiber amplifier in a no-input state, and correcting, using the obtained optical loss, the light intensity $P_{ASE}$ of spontaneous emission in said optical fiber amplifier that is measured by said light intensity measurement device;

means for obtaining a noise figure NF of an optical signal in said optical fiber amplifier using a corrected light intensity $P_{ASE}'$ of spontaneous emission in said optical fiber amplifier in accordance with the following equation:

$$NF = P_{ASE}'/(h \cdot v \cdot G \cdot \Delta v)$$

where h: Planck's constant v: light frequency of input optical signal

G: gain $\Delta v$: measurement frequency resolving power width (measurement frequency width) of said light intensity measurement device;

said light intensity device measuring a light intensity in the ON period of the optical signal input to said optical fiber amplifier;

said light intensity device measuring a light intensity in the ON period of an optical signal output from said optical fiber amplifier;

means for obtaining the gain G of said optical fiber amplifier from the light intensities in the ON periods of the optical signals input to and output from said optical fiber amplifier that are measured by said light intensity measurement device;

wherein said light intensity measurement device comprises an optical spectrum analyzer which analyzes a spectrum of output light from said optical fiber amplifier in a no-input state by said optical spectrum analyzer, thereby obtaining a calibration value of a set frequency resolving power width used as the measurement frequency resolving power width (measurement frequency width) $\Delta v$ of said light intensity measurement device from a ratio of level values of a spectrum for large and small set frequency resolving power widths;

means for obtaining an optical loss on an optical path extending from said light source to said optical fiber amplifier using output light from said optical fiber amplifier in a no-input state, and correcting, using the obtained optical loss, the light intensity in the ON period of the optical signal input to said optical fiber amplifier that is measured by said light intensity measurement device;

means for obtaining an optical loss on an optical path extending from said optical fiber amplifier to the light intensity measurement position using output light from said optical fiber amplifier in a no-input state, and correcting, using the obtained optical loss, the light intensity in the ON period of the optical signal output from said optical fiber amplifier that is measured by said light intensity measurement device;

wherein the gain G of said optical fiber amplifier is obtained from the corrected light intensities in the ON periods of the optical signals input to and output from said optical fiber amplifier;

switching means arranged between a first terminal for receiving an optical output from said light source, an input terminal of said first optical modulator, an output terminal of said first optical modulator, an input terminal of said second optical modulator, an output terminal of said second optical modulator, an output terminal to said optical fiber amplifier, an input terminal from said optical fiber amplifier, and an output terminal to said light intensity measurement device; and control means for measuring the light intensity $P_{ASE}$ of spontaneous emission in said optical fiber amplifier by a first switching operation of said switching means, measuring the gain G of said optical fiber amplifier by a second switching operation, and measuring the measurement frequency resolving power width (measurement frequency width) $\Delta v$ of said light intensity measurement device by a third switching operation.

8. An optical amplifier evaluation apparatus according to claim 7, wherein said switching means comprises:

first and second optical switches, and wherein each of said first and second optical switches has a total of four, first to fourth terminals, the first and second terminals and the third and fourth terminals of each switch being connected in a normal state, and wherein said first and second optical switches switch between "steady state" and "switching state" in accordance with an instruction from said control means.

9. An optical amplifier evaluation apparatus according to claim 8, wherein said control means stores in advance a measurement value of a reference light intensity $P_{ref}$ at each wavelength λ obtained by directly connecting said optical spectrum analyzer to an output terminal of said optical fiber amplifier in a no-input state and analyzing a spectrum of output light serving as reference light output from said optical fiber amplifier in a no-input state.

10. An optical amplifier evaluation apparatus according to claim 9, wherein said control means applies output light from said optical fiber amplifier in a no-input state to the input terminal to said first optical modulator, sets said first optical switch to the "steady state", and connects said optical spectrum analyzer to the output terminal of said optical spectrum analyzer in the "steady state", thereby measuring a light intensity Pa($\lambda$) at each wavelength $\lambda$ of the optical signal having passed from said optical fiber amplifier through an optical path including said first optical modulator and said first optical switch, an optical loss La($\lambda$) on the optical path is obtained and stored in said control means using the light intensity $P_{ref}(\lambda)$ of reference light stored in said control means in accordance with the following equation:

$$La(\lambda)=Pa(\lambda)/P_{ref}(\lambda)$$

said control means applies output light from said optical fiber amplifier in a no-input state to the input terminal to said first optical modulator, sets said first and second optical switches to the "switching state", and connects said optical spectrum analyzer to the output terminal to said optical spectrum analyzer in the "switching state", thereby measuring a light intensity Pd($\lambda$) at each wavelength $\lambda$ of the optical signal having passed from said optical fiber amplifier through an optical path including said first optical modulator and said first and second optical switches, and an optical loss Ld($\lambda$) on the optical path is obtained and stored in said control means using the light intensity $P_{ref}(\lambda)$ of reference light stored in said control means in accordance with the following equation:

$$Ld(\lambda)=Pd(\lambda)/P_{ref}(\lambda).$$

11. An optical amplifier evaluation apparatus according to claim 9, wherein said control means applies output light from said optical fiber amplifier in a no-input state to the input terminal to said optical fiber amplifier, sets said first optical switch to the "steady state", sets said second optical switch to the "switching state", and connects said optical spectrum analyzer to the output terminal to said optical spectrum analyzer in this state, thereby measuring a light intensity Pb($\lambda$) at each wavelength $\lambda$ of the optical signal having passed from said optical fiber amplifier through an optical path including only said first and second optical switches, and an optical loss Lb($\lambda$) on the optical path not including said second optical modulator is obtained and stored in said control means using the light intensity $P_{ref}(\lambda)$ of reference light stored in said control means in accordance with the following equation:

$$Lb(\lambda)=Pb(\lambda)/P_{ref}(\lambda).$$

12. An optical amplifier evaluation apparatus according to claim 9, wherein said control means applies output light from said optical fiber amplifier in a no-input state to the input terminal to said optical fiber amplifier, sets said first and second optical switches to the "steady state", and connects said optical spectrum analyzer to the output terminal to said optical spectrum analyzer in the "steady state", thereby measuring a light intensity Pc($\lambda$) at each wavelength $\lambda$ of the optical signal having passed from said optical fiber amplifier through an optical path including said first and second optical switches and said second optical modulator, and an optical loss Lc($\lambda$) on the optical path including said second optical modulator is obtained and stored in said control means using the light intensity $P_{ref}(\lambda)$ of reference light stored in said control means in accordance with the following equation:

$$Lc(\lambda)=Pc(\lambda)/P_{ref}(\lambda).$$

13. An optical amplifier evaluation apparatus according to claim 10, wherein said control means sets said first and second optical switches to the "switching state", and sends a light intensity measurement command to said optical spectrum analyzer in the "switching state" to analyze a spectrum of incident light, thereby obtaining a light intensity $P_{INM}$ at each wavelength $\lambda$, and the light intensity $P_{INM}$ is corrected using the optical losses Ld($\lambda$) and La($\lambda$) stored in said control means in accordance with the following equation:

$$P_{IN}(\lambda)=P_{INM}(\lambda)\cdot La(\lambda)/Ld(\lambda)$$

thereby obtaining a correct input light intensity $P_{IN}(\lambda)$ to said optical fiber amplifier.

14. An optical amplifier evaluation apparatus according to claim 11, wherein said control means sets said first optical switch to the "steady state", sets said second optical switch to the "switching state", and sends a light intensity measurement instruction to said optical spectrum analyzer in this state to spectrum-analyze incident light, thereby obtaining a light intensity $P_{OUTM}$ at each wavelength $\lambda$, and the light intensity $P_{OUTM}$ is corrected using the optical loss Lb($\lambda$) stored in said control means in accordance with the following equation:

$$P_{OUT}(\lambda)=P_{OUTM}(\lambda)/Lb(\lambda)$$

thereby obtaining a correct output light intensity $P_{OUT}(\lambda)$ from said optical fiber amplifier.

15. An optical amplifier evaluation apparatus according to claim 12, wherein said control means sets said first and second optical switches to the "steady state", and sends a light intensity measurement instruction to said optical spectrum analyzer in the "steady state", thereby obtaining a light intensity $P_{ASEM}$ at each wavelength $\lambda$ of an optical signal as spontaneous emission (ASE) in a partial period $T_A$ of the OFF period of the input, amplified optical signal, and the light intensity $P_{ASEM}$ is corrected using the optical loss Lc($\lambda$) stored in said control means in accordance with the following equation:

$$P_{ASE}(\lambda)=P_{ASEM}(\lambda)/Lc(\lambda)$$

thereby obtaining a correct input light intensity $P_{ASE}(\lambda)$ of spontaneous emission (ASE) in said optical fiber amplifier.

16. An optical amplifier evaluation apparatus according to claim 9, wherein said control means applies output light from said optical fiber amplifier in a no-input state to the input terminal to said first optical modulator, sets said first optical switch to the "steady state", and connects said optical spectrum analyzer to the output terminal to said optical spectrum analyzer in the "steady state", thereby measuring a light intensity Pa($\lambda$) at each wavelength $\lambda$ of the optical signal having passed from said optical fiber amplifier through an optical path including said first optical modulator and said first optical switch, an optical loss La($\lambda$) on the optical path is obtained and stored in said control means using the light intensity $P_{ref}(\lambda)$ of reference light stored in said control means in accordance with the following equation:

$$La(\lambda)=Pa(\lambda)/P_{ref}(\lambda)$$

said control means applies output light from said optical fiber amplifier in a no-input state to the input terminal to said first optical modulator, sets said first and second optical switches to the "switching state", and connects said optical spectrum analyzer to the output terminal to said optical spectrum analyzer in the "switching state", thereby measuring a light intensity Pd($\lambda$) at each wavelength $\lambda$ of the optical signal having passed from said optical fiber amplifier through an optical path including said first optical modulator and said first and second optical switches, an optical loss Ld($\lambda$) on the optical path is obtained and stored in said control means using the light intensity $P_{ref}(\lambda)$ of reference light stored in said control means in accordance with the following equation:

$$Ld(\lambda)=Pd(\lambda)/P_{ref}(\lambda)$$

said control means applies output light from said optical fiber amplifier in a no-input state to the input terminal to said optical fiber amplifier, sets said first optical switch to the "steady state", sets said second optical switch to the "switching state", and connects said optical spectrum analyzer to the output terminal to said optical spectrum analyzer in this state, thereby measuring a light intensity Pb($\lambda$) at each wavelength $\lambda$ of the optical signal having passed from said optical fiber amplifier through an optical path including only said first and second optical switches, an optical loss Lb($\lambda$) on the optical path not including said second optical modulator is obtained and stored in said control means using the light intensity $P_{ref}(\lambda)$ of reference light stored in said control means in accordance with the following equation:

$$Lb(\lambda)=Pb(\lambda)/P_{ref}(\lambda)$$

said control means applies output light from said optical fiber amplifier in a no-input state to the input terminal to said optical fiber amplifier, sets said first and second optical switches to the "steady state", and connects said optical spectrum analyzer to the output terminal to said optical spectrum analyzer in the "steady state", thereby measuring a light intensity Pc($\lambda$) at each wavelength $\lambda$ of the optical signal having passed from said optical fiber amplifier through an optical path including said first and second optical switches and said second optical modulator, and an optical loss Lc($\lambda$) on the optical path including said second optical modulator is obtained and stored in said control means using the light intensity $P_{ref}(\lambda)$ of reference light stored in said control means in accordance with the following equation:

$$Lc(\lambda)=PC(\lambda)/P_{ref}(\lambda).$$

17. An optical amplifier evaluation apparatus according to claim 16, wherein said control means sets said first and second optical switches to the "switching state", and sends a light intensity measurement command to said optical spectrum analyzer in the "switching state" to analyze a spectrum of incident light, thereby obtaining a light intensity $P_{INM}$ at each wavelength $\lambda$, the light intensity $P_{INM}$ is corrected using the optical losses Ld($\lambda$) and La($\lambda$) stored in said control means in accordance with the following equation:

$$P_{IN}(\lambda)=P_{INM}(\lambda)\cdot La(\lambda)/Ld(\lambda)$$

thereby obtaining a correct input light intensity $P_{IN}(\lambda)$ to said optical fiber amplifier, said control means sets said first optical switch to the "steady state", sets said second optical switch to the "switching state", and sends a light intensity measurement instruction to said optical spectrum analyzer in this state to spectrum-analyze incident light, thereby obtaining a light intensity $P_{OUTM}$ at each wavelength $\lambda$, the light intensity $P_{OUTM}$ is corrected using the optical loss Lb($\lambda$) stored in said control means in accordance with the following equation:

$$P_{OUT}(\lambda)=P_{OUTM}(\lambda)/Lb(\lambda)$$

thereby obtaining a correct output light intensity $P_{OUT}(\lambda)$ from said optical fiber amplifier, said control means sets said first and second optical switches to the "steady state", and sends a light intensity measurement instruction to said optical spectrum analyzer in the "steady state", thereby obtaining a light intensity $P_{ASEM}$ at each wavelength $\lambda$ of an optical signal as spontaneous emission (ASE) in a partial period $T_A$ of the OFF period of the input, amplified optical signal, and the light intensity $P_{ASEM}$ is corrected using the optical loss Lc($\lambda$) stored in said control means in accordance with the following equation:

$$P_{ASE}(\lambda)=P_{ASEM}(\lambda)/Lc(\lambda)$$

thereby obtaining a correct input light intensity $P_{ASE}(\lambda)$ of spontaneous emission (ASE) in said optical fiber amplifier.

18. An optical amplifier evaluation apparatus according to claim 17, wherein a gain G($\lambda$) and noise figure NF($\lambda$) of said optical fiber amplifier are calculated using the corrected input light intensity $P_{IN}(\lambda)$, output light intensity $P_{OUT}(\lambda)$, and light intensity $P_{ASE}(\lambda)$ of spontaneous emission (ASE) in accordance with following equations:

$$G(\lambda)=P_{OUT}(\lambda)/P_{IN}(\lambda),$$

$$NF(\lambda)=P_{ASE}(\lambda)/[h\cdot v\cdot G\cdot \Delta v]$$

where h: Planck's constant v: light frequency of input optical signal

G: gain $\Delta v$: measurement frequency resolving power width (measurement frequency width) of light intensity measurement device.

19. An optical amplifier evaluation apparatus according to claim 18, characterized in that, in the "steady state" by a command from said control means, said first optical switch inputs an optical signal having passed through the first and second terminals to an input terminal of said optical fiber amplifier via the output terminal to said optical fiber amplifier, and inputs the amplified optical signal output from an output terminal of said optical fiber amplifier to the third terminal via the input terminal from said optical fiber amplifier and then to the first terminal of said second optical switch via the fourth terminal, and in the "steady state" by a command from said control means, said second optical switch inputs the optical signal input to the first terminal, to said second optical modulator via the second terminal and the input terminal to said second optical modulator, inputs the modulated optical signal output from said second optical modulator to the third terminal via the output terminal from said second optical modulator, and inputs the optical signal input to the third terminal, to said external optical spectrum analyzer serving as said light intensity measurement via the fourth terminal and the output terminal to said light intensity measurement device, thereby allowing to measure the light intensity $P_{ASE}$ of spontaneous emission in said optical fiber amplifier by the first switching operation.

20. An optical amplifier evaluation apparatus according to claim 7, wherein said switching means comprises a total of eight terminals, i.e., an input terminal from said light source, an output terminal to said optical fiber amplifier, an input terminal from said optical fiber amplifier, an output terminal to said optical spectrum analyzer, an input terminal to said first optical modulator, an output terminal from said first optical modulator, an input terminal to said second optical modulator, and an output terminal from said second optical modulator, and connection between the terminals assembled in said switching means is arbitrarily switched by said control means.

21. An optical amplifier evaluation apparatus according to claim 7, wherein said switching means comprises a first optical switch arranged between an input terminal from said light source and an input terminal to said first optical modulator, a second optical switch arranged between an output terminal from said first optical modulator and an output terminal to said optical fiber amplifier, a third optical switch arranged between an input terminal from said optical fiber amplifier and an input terminal to said second optical modulator, and a fourth optical switch arranged between an output terminal from said second optical modulator and an output terminal to said optical spectrum analyzer, each of said first and second optical switches has a total of three, ports 0 to 2 switched by said control means, and each of said third and fourth optical switches has a total of four, ports 0 to 3 switched by said control means.

22. An optical amplifier evaluation method comprising:

modulating light output from a light source into a rectangular optical signal having predetermined ON and OFF periods by a first optical modulator;

applying the optical signal modulated by said first optical modulator to an optical fiber amplifier to be evaluated;

passing the optical signal output from said optical fiber amplifier to be evaluated through a second optical modulator only during a given period in the OFF period of the optical signal modulated by said first optical modulator, thereby measuring a light intensity $P_{ASE}$ of spontaneous emission in said optical fiber amplifier by a light intensity measurement device;

obtaining an optical loss on an optical path extending from said optical fiber amplifier to said light intensity measurement device using output light from an unpolarized light generator, in a no-input state, and correcting, using the obtained optical loss, the light intensity $P_{ASE}$ of spontaneous emission in said optical fiber amplifier that is measured by said light intensity measurement device;

obtaining a noise figure NF of an optical signal in said optical fiber amplifier using a corrected light intensity $P_{ASE}'$ of spontaneous emission in said optical fiber amplifier in accordance with the following equation:

$$NF = P_{ASE}'/(h \cdot v \cdot G \cdot \Delta v)$$

where h: Planck's constant v: light frequency of input optical signal

G: gain $\Delta v$: measurement frequency resolving power width (measurement frequency width) of said light intensity measurement device; and using an optical spectrum analyzer as said light intensity measurement device, and analyzing a spectrum of output light from said unpolarized light generator by said optical spectrum analyzer, thereby obtaining a calibration value of a set frequency resolving power width used as the measurement frequency resolving power width (measurement frequency width) $\Delta v$ of said light intensity measurement device from a ratio of level values of a spectrum for large and small set frequency resolving power widths.

23. An optical amplifier evaluation method comprising:

modulating light output from a light source into a rectangular optical signal having predetermined ON and OFF periods by a first optical modulator;

applying the optical signal modulated by said first optical modulator to an optical fiber amplifier to be evaluated;

passing the optical signal output from said optical fiber amplifier to be evaluated through a second optical modulator only during a given period in the OFF period of the optical signal modulated by said first optical modulator, thereby measuring a light intensity $P_{ASE}$ of spontaneous emission in said optical fiber amplifier by a light intensity measurement device;

obtaining an optical loss on an optical path extending from said optical fiber amplifier to said light intensity measurement device using output light from an unpolarized light generator, in a no-input state, and correcting, using the obtained optical loss, the light intensity $P_{ASE}$ of spontaneous emission in said optical fiber amplifier that is measured by said light intensity measurement device;

obtaining a noise figure NF of an optical signal in said optical fiber amplifier using a corrected light intensity $P_{ASE}'$ of spontaneous emission in said optical fiber amplifier in accordance with the following equation:

$$NF = P_{ASE}'/(h \cdot v \cdot G \cdot \Delta v)$$

where h: Planck's constant v: light frequency of input optical signal

G: gain $\Delta v$: measurement frequency resolving power width (measurement frequency width) of said light intensity measurement device;

measuring a light intensity in the ON period of the optical signal input to said optical fiber amplifier by said light intensity measurement device;

measuring a light intensity in the ON period of an optical signal output from said optical fiber amplifier by said light intensity measurement device;

obtaining the gain G of said optical fiber amplifier from the light intensities in the ON periods of the optical signals input to and output from said optical fiber amplifier that are measured by said light intensity measurement device;

obtaining an optical loss on an optical path extending from said light source to said optical fiber amplifier using output light from said unpolarized light generator, and correcting, using the obtained optical loss, the light intensity in the ON period of the optical signal input to said optical fiber amplifier that is measured by said light intensity measurement device; and obtaining an optical loss on an optical path extending from said optical fiber amplifier to the light intensity measurement position using output light from said unpolarized light generator, and correcting, using the obtained optical loss, the light intensity in the ON period of the optical signal output from said optical fiber amplifier that is measured by said light intensity measurement device, and wherein the gain G of said optical fiber amplifier is obtained from the corrected light intensities in the ON periods of the optical signals input to and output from said optical fiber amplifier.

24. An optical amplifier evaluation method comprising:

modulating light output from a light source into a rectangular optical signal having predetermined ON and OFF periods by a first optical modulator;

applying the optical signal modulated by said first optical modulator to an optical fiber amplifier to be evaluated;

passing the optical signal output from said optical fiber amplifier to be evaluated through a second optical modulator only during a given period in the OFF period of the optical signal modulated by said first optical modulator, thereby measuring a light intensity $P_{ASE}$ of spontaneous emission in said optical fiber amplifier by a light intensity measurement device;

obtaining an optical loss on an optical path extending from said optical fiber amplifier to said light intensity measurement device using output light from an unpolarized light generator, in a no-input state, and correcting, using the obtained optical loss, the light intensity $P_{ASEM}$ of spontaneous emission in said optical fiber amplifier that is measured by said light intensity measurement device;

obtaining a noise figure NF of an optical signal in said optical fiber amplifier using a corrected light intensity $P_{ASE}$ of spontaneous emission in said optical fiber amplifier in accordance with the following equation:

$$NF=P_{ASE}'/(h \cdot v \cdot G \cdot \Delta v)$$

where
h: Planck's constant
v: light frequency of input optical signal
G: gain
$\Delta v$: measurement frequency resolving power width (measurement frequency width) of said light intensity measurement device;

measuring a light intensity in the ON period of the optical signal input to said optical fiber amplifier by said light intensity measurement device;

measuring a light intensity in the ON period of an optical signal output from said optical fiber amplifier by said light intensity measurement device;

obtaining the gain G of said optical fiber amplifier from the light intensities in the ON periods of the optical signals input to and output from said optical fiber amplifier that are measured by said light intensity measurement device;

using an optical spectrum analyzer as said light intensity measurement device, and analyzing a spectrum of output light from said unpolarized light generator by said optical spectrum analyzer, thereby obtaining a calibration value of a set frequency resolving power width used as the measurement frequency resolving power width (measurement frequency width) $\Delta v$ of said light intensity measurement device from a ratio of level values of a spectrum for large and small set frequency resolving power widths.

25. An optical amplifier evaluation method according to claim 24, wherein the step of obtaining the gain G of said optical fiber amplifier comprises:

obtaining an optical loss on an optical path extending from said light source to said optical fiber amplifier using output light from said unpolarized light generator, and correcting, using the obtained optical loss, the light intensity in the ON period of the optical signal input to said optical fiber amplifier that is measured by said light intensity measurement device; and obtaining an optical loss on an optical path extending from said optical fiber amplifier to the light intensity measurement position using output light from said unpolarized light generator, and correcting, using the obtained optical loss, the light intensity in the ON period of the optical signal output from said optical fiber amplifier that is measured by said light intensity measurement device, and the wherein gain G of said optical fiber amplifier is obtained from the corrected light intensities in the ON periods of the optical signals input to and output from said optical fiber amplifier.

26. An optical amplifier evaluation apparatus comprising:

a first optical modulator for modulating light output from a light source into a rectangular optical signal having predetermined ON and OFF periods by a first optical modulator;

the optical signal modulated by said first optical modulator being applied to an optical fiber amplifier to be evaluated;

a light intensity measuring device for passing the optical signal output from said optical fiber amplifier to be evaluated through a second optical modulator only during a given period in the OFF period of the optical signal modulated by said first optical modulator, thereby measuring a light intensity $P_{ASE}$ of spontaneous emission in said optical fiber amplifier by a light intensity measurement device;

means for obtaining an optical loss on an optical path extending from said optical fiber amplifier to said light intensity measurement device using output light from an unpolarized light generator, in a no-input state, and correcting, using the obtained optical loss, the light intensity $P_{ASE}$ of spontaneous emission in said optical fiber amplifier that is measured by said light intensity measurement device;

means for obtaining a noise figure NF of an optical signal in said optical fiber amplifier using a corrected light intensity of spontaneous emission in said optical fiber amplifier in accordance with the following equation:

$$NF=P_{ASE}'/(h \cdot v \cdot G \cdot \Delta v)$$

where
h: Planck's constant
v: light frequency of input optical signal
G: gain
Δv: measurement frequency resolving power width (measurement frequency width) of said light intensity measurement device;

said light intensity measuring device measuring a light intensity in the ON period of the optical signal input to said optical fiber amplifier by said light intensity measurement device;

said light intensity measuring device measuring a light intensity in the ON period of an optical signal output from said optical fiber amplifier by said light intensity measurement device;

means for obtaining the gain G of said optical fiber amplifier from the light intensities in the ON periods of the optical signals input to and output from said optical fiber amplifier that are measured by said light intensity measurement device;

wherein said light intensity measuring device comprises an optical spectrum analyzer which analyzes a spectrum of output light from said unpolarized light generator by said optical spectrum analyzer, thereby obtaining a calibration value of a set frequency resolving sower width used as the measurement frequency resolving power width (measurement frequency width) Δv of said light intensity measurement device from a ratio of level values of a spectrum for large and small set frequency resolving power widths;

means for obtaining an optical loss on an optical path extending from said light source to said optical fiber amplifier using output light from said unpolarized light generator, and correcting using the obtained optical loss, the light intensity in the ON period of the optical signal input to said optical fiber amplifier that is measured by said light intensity measurement device;

means for obtaining an optical loss on an optical path extending from said optical fiber amplifier to the light intensity measurement position using output light from said unpolarized light generator, and correcting, using the obtained optical loss, the light intensity in the ON period of the optical signal output from said optical fiber amplifier that is measured by said light intensity measurement device, wherein the gain G of said optical fiber amplifier is obtained from the corrected light intensities in the ON periods of the optical signals input to and output from said optical fiber amplifier;

switching means arranged between a first terminal for receiving an optical output from said light source, an input terminal of said first optical modulator, an output terminal of said first optical modulator, an input terminal of said second optical modulator, an output terminal of said second optical modulator, an output terminal to said optical fiber amplifier, an input terminal from said optical fiber amplifier, and an output terminal to said light intensity measurement device; and control means for measuring the light intensity $P_{ASE}$ of spontaneous emission in said optical fiber amplifier by a first switching operation of said switching means, measuring the gain G of said optical fiber amplifier by a second switching operation, and measuring the measurement frequency resolving power width (measurement frequency width) Δv of said light intensity measurement device by a third switching operation.

27. An optical amplifier evaluation apparatus according to claim 26, wherein said switching means comprises:
first and second optical switches, and
each of said first and second optical switches has a total of four, first to fourth terminals, the first and second terminals and the third and fourth terminals of each switch being connected in a normal state, and said first and second optical switches switch between "steady state" and "switching state" in accordance with an instruction from said control means.

28. An optical amplifier evaluation apparatus according to claim 27, wherein said control means stores in advance a measurement value of a reference light intensity $P_{ref}$ at each wavelength λ obtained by directly connecting said optical spectrum analyzer to an output terminal of an unpolarized light generator and analyzing a spectrum of output light serving as reference light output from said unpolarized light generator.

29. An optical amplifier evaluation apparatus according to claim 28, wherein said control means applies output light from said unpolarized light generator to the input terminal to said first optical modulator, sets said first optical switch to the "steady state", and connects said optical spectrum analyzer to the output terminal to said optical spectrum analyzer in the "steady state", thereby measuring a light intensity Pa(λ) at each wavelength λ of the optical signal having passed from said optical fiber amplifier through an optical path including said first optical modulator and said first optical switch, an optical loss La(λ) on the optical path is obtained and stored in said control means using the light intensity $P_{ref}(λ)$ of reference light stored in said control means in accordance with the following equation:

$$La(λ)=Pa(λ)/P_{ref}(λ).$$

said control means applies output light from said unpolarized light generator to the input terminal to said first optical modulator, sets said first and second optical switches to the "switching state", and connects said optical spectrum analyzer to the output terminal to said optical spectrum analyzer in the "switching state", thereby measuring a light intensity Pd(λ) at each wavelength λ of the optical signal having passed from said optical fiber amplifier through an optical path including said first optical modulator and said first and second optical switches, and an optical loss Ld(λ) on the optical path is obtained and stored in said control means using the light intensity $P_{ref}(λ)$ of reference light stored in said control means in accordance with the following equation:

$$Ld(λ)=Pd(λ)/P_{ref}(λ).$$

30. An optical amplifier evaluation apparatus according to claim 28, wherein said control means applies output light from said unpolarized light generator to the input terminal to said optical fiber amplifier, sets said first optical switch to the "steady state", sets said second optical switch to the "switching state", and connects said optical spectrum analyzer to the output terminal to said optical spectrum analyzer in this state, thereby measuring a light intensity Pb(λ) at each wavelength λ of the optical signal having passed from said optical fiber amplifier through an optical path including only said first and second optical switches, and an optical loss Lb(λ) on the optical path not including said second optical modulator is obtained and stored in said control means using the light intensity $P_{ref}(\lambda)$ of reference light stored in said control means in accordance with the following equation:

$$Lb(\lambda)=Pb(\lambda)/P_{ref}(\lambda).$$

31. An optical amplifier evaluation apparatus according to claim 28, wherein said control means applies output light from said unpolarized light generator to the input terminal to said optical fiber amplifier, sets said first and second optical switches to the "steady state", and connects said optical spectrum analyzer to the output terminal to said optical spectrum analyzer in the "steady state", thereby measuring a light intensity $Pc(\lambda)$ at each wavelength $\lambda$ of the optical signal having passed from said optical fiber amplifier through an optical path including said first and second optical switches and said second optical modulator, and an optical loss $Lc(\lambda)$ on the optical path including said second optical modulator is obtained and stored in said control means using the light intensity $P_{ref}(\lambda)$ of reference light stored in said control means in accordance with the following equation:

$$Lc(\lambda)=Pc(\lambda)/P_{ref}(\lambda).$$

32. An optical amplifier evaluation apparatus according to claim 29, wherein said control means sets said first and second optical switches to the "switching state", and sends a light intensity measurement command to said optical spectrum analyzer in the "switching state" to analyze a spectrum of incident light, thereby obtaining a light intensity $P_{INM}$ at each wavelength $\lambda$, and the light intensity $P_{INM}$ is corrected using the optical losses $Ld(\lambda)$ and $La(\lambda)$ stored in said control means in accordance with the following equation:

$$P_{IN}(\lambda)=P_{INM}(\lambda)\cdot La(\lambda)/Ld(\lambda)$$

thereby obtaining a correct input light intensity $P_{IN}(\lambda)$ to said optical fiber amplifier.

33. An optical amplifier evaluation apparatus according to claim 30, wherein said control means sets said first optical switch to the "steady state", sets said second optical switch to the "switching state", and sends a light intensity measurement instruction to said optical spectrum analyzer in this state to spectrum-analyze incident light, thereby obtaining a light intensity $P_{OUTM}$ at each wavelength $\lambda$, and the light intensity $P_{OUTM}$ is corrected using the optical loss $Lb(\lambda)$ stored in said control means in accordance with the following equation:

$$P_{OUT}(\lambda)=P_{OUTM}(\lambda)/Lb(\lambda)$$

thereby obtaining a correct input light intensity $P_{OUT}(\lambda)$ to said optical fiber amplifier.

34. An optical amplifier evaluation apparatus according to claim 31, wherein said control means sets said first optical switch to the "steady state", sets said second optical switch to the "switching state", and sends a light intensity measurement instruction to said optical spectrum analyzer in this state to spectrum-analyze incident light, thereby obtaining a light intensity $P_{OUTM}$ at each wavelength $\lambda$, and the light intensity $P_{OUTM}$ is corrected using the optical loss $Lb(\lambda)$ stored in said control means in accordance with the following equation:

$$P_{OUT}(\lambda)=P_{OUTM}(\lambda)/Lb(\lambda)$$

thereby obtaining a correct output light intensity $P_{OUT}(\lambda)$ from said optical fiber amplifier.

35. An optical amplifier evaluation apparatus according to claim 28, wherein said control means applies output light from said unpolarized light generator to the input terminal to said first optical modulator, sets said first optical switch to the "steady state", and connects said optical spectrum analyzer to the output terminal to said optical spectrum analyzer in the "steady state", thereby measuring a light intensity $Pa(\lambda)$ at each wavelength $\lambda$ of the optical signal having passed from said optical fiber amplifier through an optical path including said first optical modulator and said first optical switch, an optical loss $La(\lambda)$ on the optical path is obtained and stored in said control means using the light intensity $P_{ref}(\lambda)$ of reference light stored in said control means in accordance with the following equation:

$$La(\lambda)=Pa(\lambda)/P_{ref}(\lambda)$$

said control means applies output light from said unpolarized light generator to the input terminal to said first optical modulator, sets said first and second optical switches to the "switching state", and connects said optical spectrum analyzer to the output terminal to said optical spectrum analyzer in the "switching state", thereby measuring a light intensity $Pd(\lambda)$ at each wavelength $\lambda$ of the optical signal having passed from said optical fiber amplifier through an optical path including said first optical modulator and said first and second optical switches, an optical loss $Ld(\lambda)$ on the optical path is obtained and stored in said control means using the light intensity $P_{ref}(\lambda)$ of reference light, stored in said control means in accordance with the following equation:

$$Ld(\lambda)=Pd(\lambda)/P_{ref}(\lambda)$$

said control means applies output light from said unpolarized light generator to the input terminal to said optical fiber amplifier, sets said first optical switch to the "steady state", sets said second optical switch to the "switching state", and connects said optical spectrum analyzer to the output terminal to said optical spectrum analyzer in this state, thereby measuring a light intensity $Pb(\lambda)$ at each wavelength $\lambda$ of the optical signal having passed from said optical fiber amplifier through an optical path including only said first and second optical switches, an optical loss $Lb(\lambda)$ on the optical path not including said second optical modulator is obtained and stored in said control means using the light intensity $P_{ref}(\lambda)$ of reference light stored in said control means in accordance with the following equation:

$$Lb(\lambda)=Pb(\lambda)/P_{ref}(\lambda)$$

said control means applies output light from said unpolarized light generator to the input terminal to said optical fiber amplifier, sets said first and second optical switches to the "steady state", and connects said optical spectrum analyzer to the output terminal to said optical spectrum analyzer in the "steady state", thereby measuring a light intensity $Pc(\lambda)$ at each wavelength $\lambda$ of the optical signal having passed from said optical fiber amplifier through an optical path including said first and second optical switches and said second optical modulator, and an optical loss $Lc(\lambda)$ on the optical path including said second optical modulator is obtained and stored in said control means using the light intensity $P_{ref}(\lambda)$ of reference light stored in said control means in accordance with the following equation:

$$Lc(\lambda)=Pc(\lambda)/P_{ref}(\lambda).$$

36. An optical amplifier evaluation apparatus according to claim 35, wherein said control means sets said first and second optical switches to the "switching state", and sends a light intensity measurement command to said optical spectrum analyzer in the "switching state" to analyze a spectrum of incident light, thereby obtaining a light intensity $P_{INM}$ at each wavelength $\lambda$, the light intensity $P_{INM}$ is corrected using the optical losses $Ld(\lambda)$ and $La(\lambda)$ stored in said control means in accordance with the following equation:

$$P_{IN}(\lambda)=P_{INM}(\lambda) \cdot La(\lambda)/Ld(\lambda)$$

thereby obtaining a correct output light intensity $P_{IN}(\lambda)$ from said optical fiber amplifier, said control means sets said first optical switch to the "steady state", sets said second optical switch to the "switching state", and sends a light intensity measurement instruction to said optical spectrum analyzer in this state to spectrum-analyze incident light, thereby obtaining a light intensity $P_{OUTM}$ at each wavelength $\lambda$, the light intensity $P_{OUTM}$ is corrected using the optical loss $Lb(\lambda)$ stored in said control means in accordance with the following equation:

$$P_{OUT}(\lambda)=P_{OUTM}(\lambda)/Lb(\lambda)$$

thereby obtaining a correct output light intensity $P_{OUT}(\lambda)$ from said optical fiber amplifier, said control means sets said first and second optical switches to the "steady state", and sends a light intensity measurement instruction to said optical spectrum analyzer in the "steady state", thereby obtaining a light intensity $P_{ASEM}$ at each wavelength $\lambda$ of an optical signal as spontaneous emission (ASE) in a partial period $T_A$ of the OFF period of the input, amplified optical signal, and the light intensity $P_{ASEM}$ is corrected using the optical loss $Lc(\lambda)$ stored in said control means in accordance with the following equation:

$$P_{ASE}(\lambda)=P_{ASEM}(\lambda)/Lc(\lambda)$$

thereby obtaining a correct input light intensity $P_{ASE}(\lambda)$ of spontaneous emission (ASE) in said optical fiber amplifier.

37. An optical amplifier evaluation apparatus according to claim 36, wherein a gain $G(\lambda)$ and noise figure $NF(\lambda)$ of said optical fiber amplifier are calculated using the corrected input light intensity $P_{IN}(\lambda)$, output light intensity $P_{OUT}(\lambda)$, and light intensity $P_{ASE}(\lambda)$ of spontaneous emission (ASE) in accordance with following equations:

$$G(\lambda)=P_{OUT}(\lambda)/P_{IN}(\lambda),$$

$$NF(\lambda)=P_{ASE}(\lambda)/[h \cdot v \cdot G \cdot \Delta v]$$

where h: Planck's constant v: light frequency of input optical signal

G: gain $\Delta v$: measurement frequency resolving power width (measurement frequency width) of light intensity measurement device.

38. An optical amplifier evaluation apparatus according to claim 37, wherein, in the "steady state" by a command from said control means, said first optical switch inputs an optical signal having passed through the first and second terminals to an input terminal of said optical fiber amplifier via the output terminal to said optical fiber amplifier, and inputs the amplified optical signal output from an output terminal of said optical fiber amplifier to the third terminal via the input terminal from said optical fiber amplifier and then to the first terminal of said second switch via the fourth terminal, and in the "steady state" by an instruction from said control means, said second optical switch inputs the optical signal input to the first terminal, to said second optical modulator via the second terminal and the input terminal to said second optical modulator, inputs the modulated optical signal output from said second optical modulator to the third terminal via the output terminal from said second optical modulator, and inputs the optical signal input to the third terminal, to said external optical spectrum analyzer serving as said light intensity measurement via the fourth terminal and the output terminal to said light intensity measurement device, thereby allowing to measure the light intensity $P_{ASE}$ of spontaneous emission in said optical fiber amplifier by the first switching operation.

39. An optical amplifier evaluation method comprising:

modulating light output from a light source into a rectangular optical signal having predetermined ON and OFF periods by a first optical modulator;

applying the optical signal modulated by said first optical modulator to an optical fiber amplifier to be evaluated;

passing the optical signal output from said optical fiber amplifier to be evaluated through a second optical modulator only during a given period in the OFF period of the optical signal modulated by said first optical modulator, thereby measuring a light intensity $P_{ASE}$ of spontaneous emission in said optical fiber amplifier by a light intensity measurement device;

obtaining an optical loss on an optical path extending from said optical fiber amplifier to said light intensity measurement device using output light from an unpolarized light generator, in a no-input state, and correcting, using the obtained optical loss, the light intensity $P_{ASE}$ of spontaneous emission in said optical fiber amplifier that is measured by said light intensity measurement device; and obtaining a noise figure NF of an optical signal in said optical fiber amplifier using a corrected light intensity $P_{ASE}'$ of spontaneous emission in said optical fiber amplifier in accordance with the following equation:

$$NF=P_{ASE}'/(h \cdot v \cdot G \cdot \Delta v)$$

where h: Planck's constant v: light frequency of input optical signal

G: gain $\Delta v$: measurement frequency resolving power width (measurement frequency width) of said light intensity measurement device.

40. An optical amplifier evaluation method according to claim 39, further comprising:

measuring a light intensity in the ON period of the optical signal input to said optical fiber amplifier by said light intensity measurement device;

measuring a light intensity in the ON period of an optical signal output from said optical fiber amplifier by said light intensity measurement device; and obtaining the gain G of said optical fiber amplifier from the light intensities in the ON periods of the optical signals input to and output from said optical fiber amplifier that are measured by said light intensity measurement device.

* * * * *